United States Patent
Katada et al.

(10) Patent No.: US 11,370,064 B2
(45) Date of Patent: Jun. 28, 2022

(54) ZIPPER TAPE, BAG WITH ZIPPER TAPE, METHOD FOR MANUFACTURING BAG WITH ZIPPER TAPE, LONG MEMBER-BONDING METHOD CAPABLE OF FAVORABLY BONDING LONG MEMBERS, DEVICE THEREFOR, AND ZIPPER TAPE-BONDING DEVICE

(71) Applicant: IDEMITSU UNITECH CO., LTD., Tokyo (JP)

(72) Inventors: Ryo Katada, Chiba (JP); Shuichi Goto, Chiba (JP); Koji Kakigami, Chiba (JP); Yoshinori Namba, Chiba (JP)

(73) Assignee: IDEMITSU UNITECH CO., LTD., Tokyo (JP)

( * ) Notice: Subject to any disclaimer, the term of this patent is extended or adjusted under 35 U.S.C. 154(b) by 10 days.

(21) Appl. No.: 15/565,073

(22) PCT Filed: Apr. 7, 2016

(86) PCT No.: PCT/JP2016/061459
§ 371 (c)(1),
(2) Date: Oct. 6, 2017

(87) PCT Pub. No.: WO2016/163487
PCT Pub. Date: Oct. 13, 2016

(65) Prior Publication Data
US 2018/0093352 A1     Apr. 5, 2018

(30) Foreign Application Priority Data

Apr. 8, 2015 (JP) ................................. 2015-079633
Apr. 8, 2015 (JP) ............................. JP2015-079632

(51) Int. Cl.
*B23K 26/354* (2014.01)
*B31B 70/81* (2017.01)
(Continued)

(52) U.S. Cl.
CPC ............ *B23K 26/354* (2015.10); *B23K 20/00* (2013.01); *B29C 65/14* (2013.01); *B31B 50/81* (2017.08);
(Continued)

(58) Field of Classification Search
CPC .............................. B29C 65/14; B65B 61/188
See application file for complete search history.

(56) References Cited

U.S. PATENT DOCUMENTS 5,004,356 A   4/1991   Matsui
5,279,693 A   1/1994   Robinson et al.
(Continued)

FOREIGN PATENT DOCUMENTS

CN   101318259 B   6/2011
CN   101374435 B   7/2011
(Continued)

OTHER PUBLICATIONS

Falat Group, "LDPE," Falat Group (Year: 2011).*
(Continued)

*Primary Examiner* — Maria V Ewald
*Assistant Examiner* — Ethan Weydemeyer
(74) *Attorney, Agent, or Firm* — Millen, White, Zelano & Branigan, PC; Ryan Pool

(57) ABSTRACT

A light-absorbing layer and a bonding layer are layered on a first side of each of a belt-shaped male base portion integrated with a male portion and a female base portion integrated with a female portion on a side of the male and female base portions opposite the first side. The light-absorbing layer contains a light-absorbing material having a wavelength absorption range from 800 nm to 1200 nm to absorb a laser beam of the range. The bonding layer contains a low-melting-point resin in a form of a metallocene linear low-density polyethylene having a melting point ranging (Continued)

from 60 degrees C. to 120 degrees C. When the zipper tape is bonded to the base film, the laser beam is applied to heat the light-absorbing layer to melt the bonding layer. The melted bonding layer is pressure-bonded to the base film. The base film can be bonded without causing thermal degradation.

17 Claims, 25 Drawing Sheets

(51) Int. Cl.
 B29C 65/14 (2006.01)
 B23K 20/00 (2006.01)
 B31B 50/81 (2017.01)
 B65D 33/25 (2006.01)
 B65B 61/18 (2006.01)
(52) U.S. Cl.
 CPC ........ *B31B 70/813* (2017.08); *B65D 33/2508* (2013.01); *B65B 61/188* (2013.01)

(56) References Cited

U.S. PATENT DOCUMENTS

| | | | | |
|---|---|---|---|---|
| 5,338,611 | A * | 8/1994 | Lause | B29C 65/1425 156/272.2 |
| 5,712,332 | A | 1/1998 | Kaieda | |
| 2003/0130381 | A1 | 7/2003 | Joachimi | |
| 2004/0056006 | A1 | 3/2004 | Jones | |
| 2004/0251164 | A1 * | 12/2004 | Yasuike | B65D 33/2541 206/524.4 |
| 2007/0051461 | A1 | 3/2007 | Pfleging | |
| 2008/0031552 | A1 | 2/2008 | Tanaka | |
| 2008/0302769 | A1 | 12/2008 | Yamazaki et al. | |
| 2009/0022435 | A1 | 1/2009 | Tanaka et al. | |
| 2010/0185171 | A1 | 7/2010 | Muramatsu et al. | |
| 2010/0220940 | A1 * | 9/2010 | Katada | B65D 33/2508 383/64 |
| 2012/0201480 | A1 | 8/2012 | Goto et al. | |
| 2013/0259407 | A1 | 10/2013 | Muramatsu et al. | |

FOREIGN PATENT DOCUMENTS

| | | | |
|---|---|---|---|
| CN | 102686121 | A | 9/2012 |
| CN | 102873870 | A | 1/2013 |
| CN | 103660294 | A | 3/2014 |
| DE | 102004030619 | A1 | 1/2006 |
| EP | 0371402 | A2 | 6/1990 |
| EP | 1306404 | A1 | 5/2003 |
| EP | 2189270 | A1 | 5/2010 |
| JP | 02-152662 | A | 6/1990 |
| JP | 2002-526261 | A | 8/2002 |
| JP | 2003312690 | A * | 11/2003 |
| JP | 2009012356 | A | 1/2009 |
| JP | 2009066820 | A | 4/2009 |
| JP | 2009125963 | A | 6/2009 |
| JP | 2010035713 | A | 2/2010 |
| JP | 2010-146791 | A | 7/2010 |
| JP | 2015016900 | A | 1/2015 |
| KR | 20100061682 | A | 6/2010 |
| KR | 20100086488 | A | 7/2010 |
| TW | 2006-02237 | A | 1/2006 |
| WO | 2009-022739 | A1 | 2/2009 |
| WO | 11046141 | A1 | 4/2011 |
| WO | 2014/166506 | A1 | 10/2014 |
| WO | 2014208514 | A1 | 12/2014 |

OTHER PUBLICATIONS

Search report in corresponding JP appln. No. 2015-079633 dated Nov. 30, 2018 (pp. 1-2) and Summary of references cited.
Search report in corresponding EP appln. No. 16776653.4 dated Nov. 27, 2018 (pp. 1-14) and Summary of references cited. .
Office Action in corresponding JP appln. No. 2015-079633 dated Dec. 11, 2018 (pp. 1-2) and Summary of references cited.
English Translation of International Preliminary Report on Patentability for PCT/JP2016/061459 dated Apr. 7, 2016.
International Search Report for PCT/JP2016/061459 dated Jun. 28, 2016.
English Abstract for JP2015016900, Publication Date: Jan. 29, 2015.
English Abstract for JP2009012356, Publication Date: Jan. 22, 2009.
English Abstract of WO2014208514, Publication Date: Dec. 31, 2017.
Office Action in corresponding TW appln. 105111139 dated Jun. 21, 2019 (pp. 1-7 ).
Office Action in corresponding CN appln. 201680020170.3 dated Apr. 25, 2019 (pp. 1-9).
Pretrial Reexamination Report issued for the corresponding Japanese patent application No. 2015-079633 dated Dec. 11, 2019 (pp. 1-4) and pre-report (1 page).
Office Action issued in corresponding Japanese patent application No. 2019-201472 dated Nov. 10, 2020 (pp. 1-2).
Office Action in corresponding CN appl.202011219720.9 dated Dec. 16, 2021 (pp. 1-10).
Office Action issued in corresponding Korean patent application No. 10-2017-7031869 dated Feb. 17, 2022 (pp. 1-4) and english translation thereof (pp. 1-4).

* cited by examiner

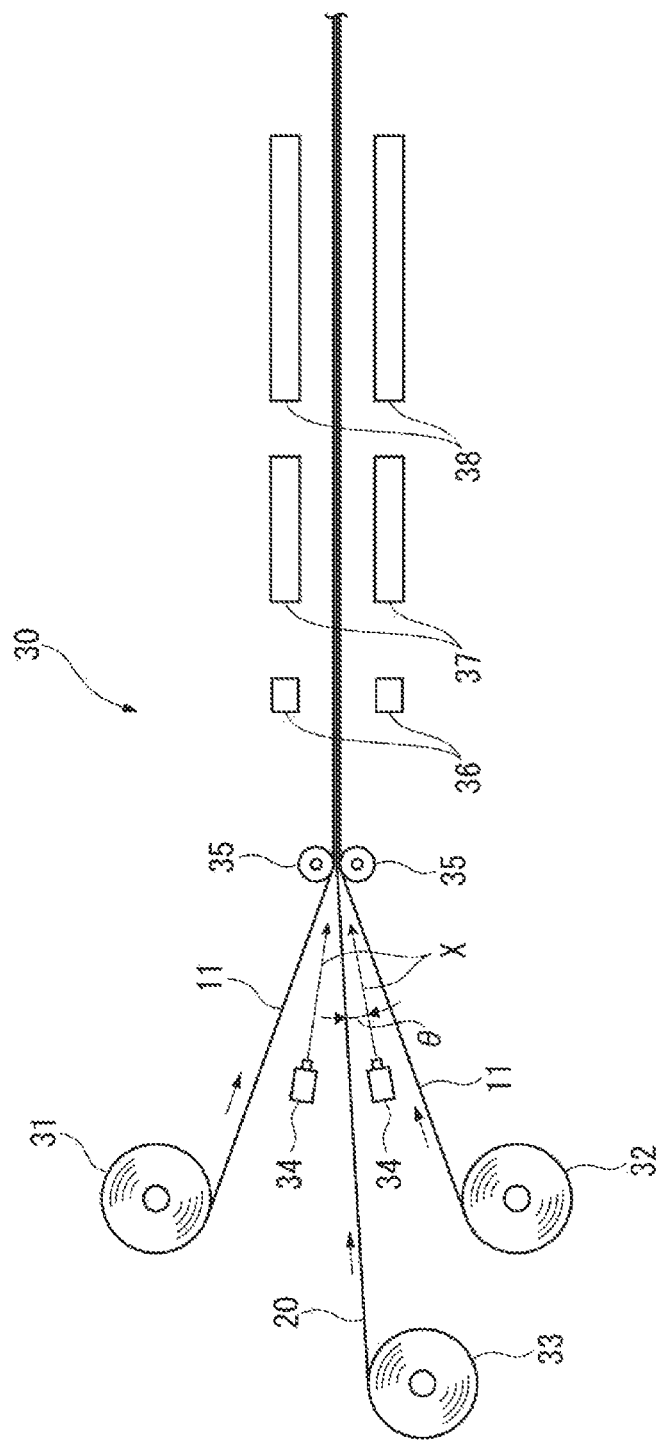

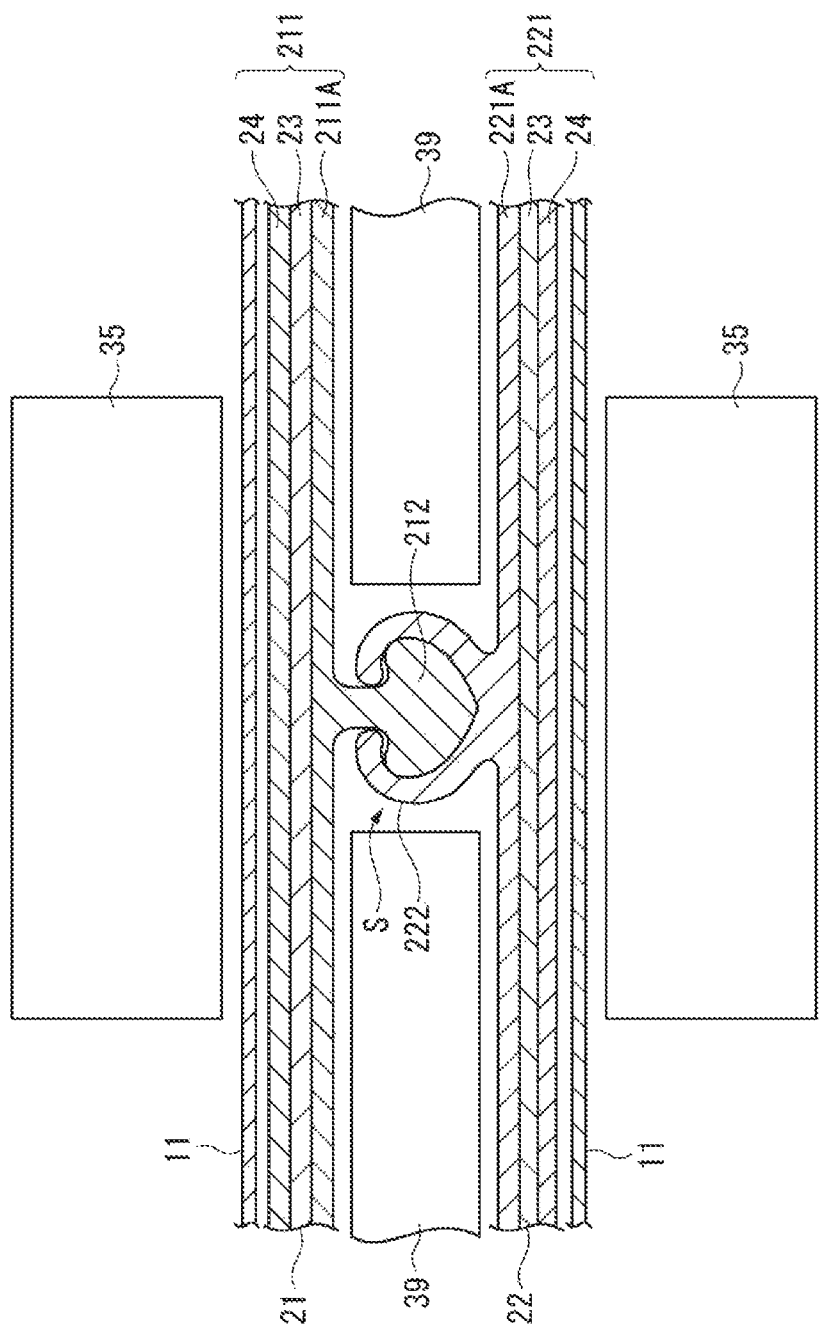

ZIPPER TAPE, BAG WITH ZIPPER TAPE, METHOD FOR MANUFACTURING BAG WITH ZIPPER TAPE, LONG MEMBER-BONDING METHOD CAPABLE OF FAVORABLY BONDING LONG MEMBERS, DEVICE THEREFOR, AND ZIPPER TAPE-BONDING DEVICE

TECHNICAL FIELD

The present invention relates to a zipper tape, a zipper-tape bag, a manufacturing method of a zipper-tape bag, a bonding method of an elongated member capable of favorably bonding an elongated member, a device for bonding an elongated member and a bonding device of a zipper tape.

BACKGROUND ART

In order to manufacture a zipper-tape bag, it has been typically known to irradiate a zipper tape with a laser beam to bond the zipper tape to a film (see, for instance, Patent Literature 1).

In the method disclosed in Patent Literature 1, a pair of mutually engagable fastener members are disposed between a folded sheet, and a bondable portion of the fastener members and the sheet is irradiated with a converging laser beam through the sheet to bond the fastener members and the sheet with each other.

CITATION LIST

Patent Literature(s)

Patent Literature 1: U.S. Pat. No. 5,279,693

SUMMARY OF THE INVENTION

Problem(s) to be Solved by the Invention

However, the typical method as disclosed in Patent Literature 1 may entail disadvantages such as thermal degradation of the sheet being irradiated with laser, which results in deterioration of barrier performance of the sheet, and wrinkles and sag of the sheet due to heat shrinkage thereof.

An object of the invention is to provide a zipper tape that is capable of being favorably bonded using an energy beam, a zipper-tape bag, and a manufacturing method of a zipper-tape bag, and to provide a bonding method of an elongated member capable of favorably bonding an elongated member, a device for bonding an elongated member and a bonding device of a zipper tape.

Means for Solving the Problem(s)

A zipper tape according to an aspect of the invention includes: a pair of a male member and a female member; and a light-absorbing material having a wavelength absorption range from 800 nm to 1200 nm, the light-absorbing material being contained in at least a part of the zipper tape.

According to the above aspect of the invention, the zipper tape contains in at least a part thereof the light-absorbing material having the wavelength absorption range from 800 nm to 1200 nm to absorb the energy beam, the light-absorbing material efficiently absorbs the energy beam and a part containing the light-absorbing material and/or a resin-containing part adjacent to the part containing the light-absorbing material can be selectively melted. Therefore, thermal degradation of the film on which the zipper tape is attached can be restrained and the zipper tape can be favorably bonded.

The energy beam herein is not particularly limited as long as being usable for irradiation. For instance, a laser beam having a wavelength in an invisible light region (e.g. ultraviolet region, infrared region) can be selectively used as desired.

In the above aspect of the invention, the light-absorbing material may be at least one of an organic compound and an inorganic compound, the organic compound being at least one compound selected from the group consisting of a phthalocyanine compound, a cyanine compound, an aminium compound, an imonium compound, a squarylium compound, a polymethine compound, an anthraquinone compound and an azo compound, the inorganic compound being at least one substance selected the group consisting of carbon black, an element metal, a metal salt, a metal complex, a metal nitride, a metal oxide, and a metal hydroxide.

Further in the above aspect of the invention, the male member may include a layered structure including at least two layers, and may include a male belt-shaped base and a male portion provided on a side of the male belt-shaped base, the female member may include a layered structure including at least two layers, and may include a female belt-shaped base and a female portion which is provided on a side of the female belt-shaped base and is capable of receiving the male portion, and at least one of the male belt-shaped base and the female belt-shaped base may include a light-absorbing layer including the light-absorbing material as at least one of the at least two layers other than a surface layer on which the male portion or the female portion are provided.

According to the above arrangement, since the light-absorbing layer is exposed to at least one of the layers other than the surface layer on which the male portion and the female portion are provided on the male belt-shaped base and the female belt-shaped base (i.e. a side to be the bondable portion when the zipper tape is attached), the side to be the bondable portion can be selectively melted by applying the energy beam, so that the zipper tape can be efficiently attached without damaging the other part(s).

Further in the above aspect of the invention, the male member may include a layered structure including at least three layers and may include a male belt-shaped base and a male portion provided on a side of the male belt-shaped base, the female member may include a layered structure including at least three layers and may include a female belt-shaped base and a female portion which is provided on a side of the female belt-shaped base and is capable of receiving the male portion, and at least one of the male belt-shaped base and the female belt-shaped base may include: a bonding layer exposed on a side opposite the side on which the male portion or the female portion is exposed, the bonding layer including a resin whose melting point ranges from 60 degrees C. to 120 degrees C.; and a light-absorbing layer adjacent to the bonding layer and including the light-absorbing material.

According to the above arrangement, the bonding layer containing the resin of a predetermined melting point is provided on the side opposite the side on which the male portion or the female portion is provided on the male belt-shaped base or the female belt-shaped base (i.e. the side to be the bondable portion when the zipper tape is attached). Then, the light-absorbing material of the light-absorbing layer adjacent to the bonding layer absorbs the applied energy beam to raise the temperature thereof, thereby melting the bonding layer. Thus, the side to be the bondable portion can be selectively melted by applying the energy beam, so that the zipper tape can be efficiently attached without damaging the other part(s). Further, since the light-absorbing material is not contained in the bonding layer itself, the bondability with the part to be attached is not impaired by the light-absorbing material.

In the above aspect of the invention, at least one of the male portion and the female portion may be formed of a resin not absorbing a wavelength ranging from 800 nm to 1200 nm.

According to the above arrangement, since the male portion and the female portion are formed of the resin not absorbing the wavelength ranging from 800 nm to 1200 nm, even when the energy beam is applied on the male portion and the female portion, the male portion and the female portion can be kept from being melted and deformed.

In the above aspect of the invention, a part of the zipper tape, which includes the light-absorbing material, may include a resin having a melting point ranging from 60 degrees C. to 120 degrees C.

According to the above arrangement, since the resin of the predetermined melting point is contained in the part containing the light-absorbing material, the heat energy generated by the light-absorbing material absorbing the applied energy beam can directly act for melting the resin, thereby efficiently using the irradiation energy of the energy beam to attach the zipper tape.

In the above aspect of the invention, a main component of the resin may be a metallocene olefin produced using a metallocene catalyst.

According to the above arrangement, since the resin whose main component is the metallocene olefin produced using the metallocene catalyst is used, molecular weight distribution can be narrowed and the melting point can be lowered, so that the zipper tape can be efficiently bonded with a low energy.

A zipper-tape bag according to another aspect of the invention includes: a bag body including an at least partially overlapped film; and a zipper tape according to the above aspect of the invention, which is attached to an inner surface of the bag body.

According to the above arrangement, the part of the zipper tape containing the light-absorbing material can be selectively melted, so that the film can be restrained from being thermally degraded by the energy beam, thereby keeping the yield rate from being decreased.

A method of manufacturing a zipper-tape bag according to still another aspect of the invention attaches the zipper tape according to the above aspect of the invention on a film, the method including: irradiating the zipper tape with an energy beam of a wavelength ranging from 800 nm to 1200 nm; and pressure-bonding the film on a part of the zipper tape irradiated with the energy beam to be melted by the irradiating.

According to the above arrangement, after the energy beam is applied on the zipper tape of the above aspect of the invention containing the light-absorbing material absorbing the predetermined energy beam to melt the bondable portion, the melted bondable portion is pressure-bonded to the film. Accordingly, the film can be kept from being thermally degraded by the energy beam, thereby preventing the decrease in the yield rate. Further, the irradiation energy of the energy beam can be efficiently used to melt the zipper tape, so that the zipper tape can be efficiently attached.

In the above aspect of the invention, in the irradiating, the zipper tape may be moved along a circumferential surface of a roller while the zipper tape is held on the circumferential surface of the roller, and the energy beam may be applied on a bondable portion of the zipper tape to be bonded with the film and facing in an outer circumferential direction of the roller, and, in the pressure-bonding, the film may be wrapped around the circumferential surface of the roller to be moved at a position downstream in a moving direction of the zipper tape on the roller with respect to a point irradiated with the energy beam, and the film may be pressure-bonded to the bondable portion of the zipper tape.

According to the above arrangement, after the energy beam is applied on the bondable portion of the zipper tape held on the circumferential surface of the roller to melt the bondable portion, the film is wrapped around the roller to pressure-bond the film onto the zipper tape. Thus, the film can be kept from being damaged or deformed by the energy beam, so that the zipper tape can be favorably bonded. Further, the irradiation energy of the energy beam can be exclusively used to melt the zipper tape, so that the bonding process can be efficiently performed.

In the above arrangement, the zipper tape or the film can be suitably manufactured using a synthetic resin, and the synthetic resin is not particularly limited. For instance, a polyolefin member (e.g. polyethylene and polypropylene) or the like is suitably usable.

Further, any roller can be used as long as being capable of rotations. For instance, a cylindrical member or polygonal member is suitably usable for the roller.

The energy beam herein is not particularly limited as long as being usable for irradiation. For instance, a laser beam having a wavelength in an invisible light region (e.g. ultraviolet region, infrared region) can be selectively used as desired.

In the above aspect of the invention, in the irradiating, using the roller including an introduction groove in a form of a dented groove along a circumferential direction, while the zipper tape is received in the introduction groove, the zipper tape may be moved along the circumferential surface of the roller and the energy beam may be applied on a bondable portion of the zipper tape.

According to the above arrangement, since the zipper tape is moved while being received in the introduction groove of the roller and is continuously melted by applying the energy beam, the zipper tape can be melted in a short time using the energy beam, thereby reducing the time required for the bonding process.

In the above aspect of the invention, the introduction groove of the roller may have such a depth that the bondable portion of the zipper tape is flush with the circumferential surface of the roller.

According to the above arrangement, since the depth of the introduction groove is defined so that the bondable portion of the zipper tape received in the introduction groove is flush with the circumferential surface of the roller, the film can be kept from being wrinkled or sagged when the film is pressure-bonded on the zipper tape. Thus, the zipper tape and the film can be favorably bonded.

In the above aspect of the invention, in the irradiating, the zipper tape may be moved along the circumferential surface of the roller while the zipper tape is held with a longitudinal direction of the zipper tape being aligned with an axial direction of the roller, and the energy beam may be applied on the bondable portion of the zipper tape facing in an outer circumferential direction of the roller.

According to the above arrangement, since the energy beam is applied at the bondable portion of the zipper tape held with the longitudinal direction being aligned with the axial direction of the roller to melt the bondable portion, the zipper tape can be melted in a short time using the energy beam. Thus, the zipper tape can be sequentially bonded to the film in a short time.

In the above aspect of the invention, the zipper tape may be held on the circumferential surface of the roller by sucking the zipper tape using a suction air.

According to the above arrangement, since the zipper tape is sucked to be held using the suction air, the zipper tape can be appropriately held and reliably bonded at the predetermined position of the film.

The suction air can be supplied from an interior of the roller through at least one suction port provided on the circumferential of the roller in contact with the zipper tape, thereby appropriately holding the zipper tape. The zipper tape can be held with at least one suction port. However, it is preferable that a plurality of suction ports are provided on the circumferential surface of the roller and more preferably provided in a dispersed manner in order to more stably hold the zipper tape.

In the above aspect of the invention, in the irradiating, the energy beam may be applied on the zipper tape while following the movement of the zipper tape along the circumferential surface of the roller.

According to the above arrangement, since the energy beam is applied following the zipper tape moving along the circumferential surface of the roller, the zipper tape can be reliably melted and can be reliably bonded to the film.

In the above aspect of the invention, in the irradiating, the energy beam may be applied at an incident angle intersecting a normal line of the circumferential surface of the roller.

According to the above arrangement, the energy beam is applied at the incident angle intersecting the normal line of the circumferential surface of the roller, the energy beam can be kept from being interfered with the other component(s) and the energy of the energy beam can be efficiently supplied on the bonding surface. Accordingly, the zipper tape can be easily bonded to the film before being cooled and solidified.

In the above aspect of the invention, at least the bondable portion of the zipper tape may have a composition exhibiting an absorption capability to the energy beam.

According to the above arrangement, as long as at least the bondable portion of the zipper tape has a composition exhibiting absorption capability to the energy beam, the zipper tape and the film can be favorably bonded by applying the energy beam. When the zipper tape is a laminate including at least two layers, as long as at least one of the layers of the zipper tape not bonded with the film has a composition exhibiting an absorption capability to the energy beam, the zipper tape and the film can be favorably bonded by applying the energy beam.

The composition exhibiting the absorption capability to the energy beam is not specifically limited. Suitably usable examples of the composition includes an organic compound such as a phthalocyanine compound, a cyanine compound, an aminium compound, an imonium compound, a squarylium compound, a polymethine compound, an anthraquinone compound and an azo compound, and an inorganic compound such as carbon black, an element metal, a metal salt, a metal complex, a metal nitride, a metal oxide, and a metal hydroxide.

In the above aspect of the invention, the zipper tape may be a laminate including at least two layers, at least one of the layers of the zipper tape not bonded with the film having a composition exhibiting an absorption capability to the energy beam.

According to the above arrangement, since the one of the layers of the zipper tape not bonded to the film has the composition exhibiting the absorption capability to the energy beam, even when the energy beam cannot be directly applied on the bondable portion of the zipper tape, the energy beam can be applied from the side not bonded with the film to cause the layer having the composition exhibiting the absorption capability to generate heat, thereby melting the bondable portion and bonding the bondable portion to the film.

In the above aspect of the invention, the energy beam may be a laser beam of a wavelength in an invisible light region.

According to the above arrangement, the laser beam having a wavelength in the invisible light region, which is widely available, can be used to facilitate the handling of the laser beam and enhance the bonding performance for the zipper tape.

In the above aspect of the invention, a bag may be made using the film attached with the zipper tape according to the manufacturing method of the above aspect of the invention.

In the above arrangement, since the film bonded with the zipper tape is efficiently made, the time required for making the bag can be reduced, thereby improving the production efficiency. Further, since only the zipper tape is melted, the properties of the film (e.g. barrier property, translucency and flexibility) are not impaired, thereby providing a favorable zipper-tape bag. In addition, the irradiation energy of the energy beam can be exclusively used to melt the zipper tape, so that the energy efficiency can also be enhanced.

A bonding device of a zipper tape configured to bond the zipper tape to a film of a further aspect of the invention includes: a roller configured to hold the zipper tape on a circumferential surface thereof; an irradiator configured to apply an energy beam on a part of the zipper tape held on the roller and to be bonded with the film, the part of the zipper tape facing in an outer circumferential direction of the roller, and a pressure-bonder configured to wrap and move the film around the circumferential surface of the roller and located at a position downstream in a moving direction of the zipper tape on the roller with respect to a point irradiated with the energy beam, and to pressure-bond the film to a bondable portion of the zipper tape.

According to the above aspect of the invention, after the energy beam is applied on the bondable portion of the zipper tape held on the circumferential surface of the roller to melt the bondable portion, the film is wrapped around the roller to pressure-bond the film onto the zipper tape. Thus, the film can be kept from being damaged or deformed by the energy beam, so that the zipper tape can be favorably bonded. Further, the irradiation energy of the energy beam can be exclusively used to melt the zipper tape, so that the bonding process can be efficiently performed.

A method of bonding a first elongated member to a second elongated member according to still further aspect of the invention includes: moving the first elongated member along a circumferential surface of a roller while the first elongated member is held on the circumferential surface of the roller; irradiating with an energy beam a part of the first elongated member to be bonded with the second elongated member, the part of the first elongated member facing an outer circumferential direction of the roller; wrapping and moving the second elongated member around the circumferential surface of the roller located at a position downstream in a moving direction of the first elongated member on the roller with respect to a point irradiated with the energy beam; and pressure-bonding the second elongated member to a bondable portion of the first elongated member.

According to the above arrangement, after the energy beam is applied on the bondable portion of the first elongated member held on the circumferential surface of the roller to melt the bondable portion, the second elongated member is wrapped around the roller to pressure-bond the second elongated member onto the first elongated member. Thus, the second elongated member can be kept from being damaged or deformed by the energy beam, so that the first elongated member can be favorably bonded. Further, the irradiation energy of the energy beam can be exclusively used to melt the first elongated member, so that the bonding process can be efficiently performed.

In the above arrangement, the first elongated member or the second elongated member can be suitably manufactured using a synthetic resin, and the synthetic resin is not particularly limited. For instance, a polyolefin member (e.g. polyethylene and polypropylene) or the like is suitably usable.

Further, any roller can be used as long as being capable of rotations. For instance, a cylindrical member or polygonal member is suitably usable for the roller.

The energy beam herein is not particularly limited as long as being usable for irradiation. For instance, a laser beam having a wavelength in an invisible light region (e.g. ultraviolet region, infrared region) can be selectively used as desired.

In the above aspect of the invention, it is preferable that, in the irradiating, using the roller including an introduction groove in a form of a dented groove along a circumferential direction, while the first elongated member is received in the introduction groove, the first elongated member is moved along the circumferential surface of the roller and the energy beam is applied on the bondable portion of the first elongated member to bond the first elongated member to the second elongated member.

According to the above arrangement, since the first elongated member is moved while being received in the introduction groove of the roller and is continuously melted by applying the energy beam, the first elongated member can be melted in a short time using the energy beam, thereby reducing the time required for the bonding process.

Further, in the above aspect of the invention, it is preferable that the introduction groove of the roller has such a depth that the bondable portion of the first elongated member is flush with the circumferential surface of the roller.

According to the above arrangement, since the depth of the introduction groove is defined so that the bondable portion of the first elongated member received in the introduction groove is flush with the circumferential surface of the roller, the second elongated member can be kept from being wrinkled or sagged when the second elongated member is pressure-bonded on the first elongated member. Thus, the first elongated member and the second elongated member can be favorably bonded.

Further, in the above aspect of the invention, it is preferable that, in the irradiating, the first elongated member is moved along the circumferential surface of the roller while the first elongated member is held with a longitudinal direction of the first elongated member being aligned with an axial direction of the roller, and the energy beam is applied on the bondable portion of the first elongated member facing in an outer circumferential direction of the roller.

According to the above arrangement, since the energy beam is applied to the bondable portion of the first elongated member held with the longitudinal direction being aligned with the axial direction of the roller to melt the bondable portion, the first elongated member can be melted in a short time using the energy beam. Accordingly, the first elongated member can be sequentially bonded to the second elongated member in a short time.

In the above aspect of the invention, it is preferable that the first elongated member is held on the circumferential surface of the roller by sucking the first elongated member using a suction air.

According to the above arrangement, since the first elongated member is sucked to be held using the suction air, the first elongated member can be appropriately held and reliably bonded at the predetermined position of the second elongated member.

The suction air can be supplied from an interior of the roller through at least one suction port provided on the circumferential of the roller in contact with the first elongated member, thereby appropriately holding the first elongated member. The first elongated member can be held with at least one suction port. However, it is preferable that a plurality of suction ports are provided on the circumferential surface of the roller and more preferably provided in a dispersed manner in order to more stably hold the first elongated member.

Further, in the above aspect of the invention, it is preferable that, in the irradiating, the energy beam is applied on the first elongated member while following the movement of the first elongated member along the circumferential surface of the roller.

According to the above arrangement, since the energy beam is applied following the first elongated member moving along the circumferential surface of the roller, the first elongated member can be reliably melted and can be reliably bonded to the second elongated member.

In the above aspect of the invention, it is preferable that, in the irradiating, the energy beam is applied at an incident angle intersecting a normal line of the circumferential surface of the roller.

According to the above arrangement, since the energy beam is applied at the incident angle intersecting the normal line of the circumferential surface of the roller, the energy beam can be kept from being interfered with the other component(s) and the energy of the energy beam can be efficiently supplied on the bonding surface. Accordingly, the first elongated member can be easily bonded to the second elongated member before the first elongated member is cooled and solidified.

In the above aspect of the invention, it is preferable that at least the bondable portion of the first elongated member has a composition exhibiting an absorption capability to the energy beam.

According to the above arrangement, as long as at least the bondable portion of the first elongated member has a composition exhibiting absorption capability to the energy beam, the first elongated member and the second elongated member can be favorably bonded by applying the energy beam. When the first elongated member is a laminate including at least two layers, as long as at least one of the layers of the first elongated member not bonded with the second elongated member has a composition exhibiting an absorption capability to the energy beam, the first elongated member and the second elongated member can be favorably bonded by applying the energy beam.

The composition exhibiting the absorption capability to the energy beam is not specifically limited. Suitably usable examples of the composition includes an organic compound such as a phthalocyanine compound, a cyanine compound, an aminium compound, an imonium compound, a squarylium compound, a polymethine compound, an anthraquinone compound and an azo compound, and an inorganic compound such as carbon black, an element metal, a metal salt, a metal complex, a metal nitride, a metal oxide, and a metal hydroxide.

In the above aspect of the invention, it is preferable that the first elongated member is a laminate including at least two layers, at least one of the layers of the first elongated member not bonded with the second elongated member has a composition exhibiting an absorption capability to the energy beam.

According to the above arrangement, since the one of the layers of the first elongated member not bonded to the second elongated member has the composition exhibiting the absorption capability to the energy beam, even when the energy beam cannot be directly applied on the bondable portion of the first elongated member, the energy beam can be applied from the side not bonded with the second elongated member to cause the layer having the composition exhibiting the absorption capability to generate heat, thereby melting the bondable portion and bonding the bondable portion to the second elongated member.

In the above aspect of the invention, it is preferable that the energy beam is a laser beam of a wavelength in an invisible light region.

According to the above arrangement, the laser beam having a wavelength in the invisible light region, which is widely available, can be used to facilitate the handling of the laser beam and enhance the bonding performance.

In the above aspect of the invention, it is preferable that the first elongated member is a zipper tape, and the second elongated member is a film.

According to the above arrangement, since the zipper tape is bonded to the film, the time required for melting the zipper tape and bonding the zipper tape to the film can be reduced and the zipper tape can be continuously bonded, thereby improving the working efficiency. Further, the film can be kept from being damaged or deformed by the applied energy beam, so that the zipper tape can be favorably bonded.

In a method of manufacturing a zipper-tape bag according to still further aspect of the invention, a bag is made using the film attached with the zipper tape through the bonding method of the elongated members according to the bonding method of the above aspect of the invention.

In the above arrangement, since the film bonded with the zipper tape is efficiently made, the time required for making the bag can be reduced, thereby improving the production efficiency. Further, since only the zipper tape is melted, the properties of the film (e.g. barrier property, translucency and flexibility) are not impaired, thereby providing a favorable zipper-tape bag. In addition, the irradiation energy of the energy beam can be exclusively used to melt the zipper tape, so that the energy efficiency can also be enhanced.

A bonder according to still further aspect of the invention is configured to bond a first elongated member to a second elongated member, the bonder including: a roller configured to hold the first elongated member on a circumferential surface thereof; an irradiator configured to apply an energy beam on a part of the first elongated member held on the roller and to be bonded with the second elongated member, the part of the first elongated member facing in an outer circumferential direction of the roller, and a pressure-bonder configured to wrap and move the second elongated member around the circumferential surface of the roller and located at a position downstream in a moving direction of the first elongated member on the roller with respect to a point irradiated with the energy beam, to pressure-bond the second elongated member to a bondable portion of the first elongated member.

According to the above arrangement, after the energy beam is applied on the bondable portion of the first elongated member held on the circumferential surface of the roller to melt the bondable portion, the second elongated member is wrapped around the roller to pressure-bond the second elongated member onto the first elongated member. Thus, the second elongated member can be kept from being damaged or deformed by the energy beam, so that the first elongated member can be favorably bonded. Further, the irradiation energy of the energy beam can be exclusively used to melt the first elongated member, so that the bonding process can be efficiently performed.

BRIEF DESCRIPTION OF DRAWING(S)

FIG. 3 is a schematic illustration of a manufacturing apparatus of the zipper-tape bag.

FIG. 4 illustrates a bonding step in manufacturing the zipper-tape bag.

DESCRIPTION OF EMBODIMENT(S)

Exemplary embodiments of the invention will be described below with reference to the attached drawings.

First Exemplary Embodiment

In the first exemplary embodiment, a zipper-tape bag is exemplified by a packaging bag for packaging various articles such as foods, medicines, medical products and groceries.

Figure 1:
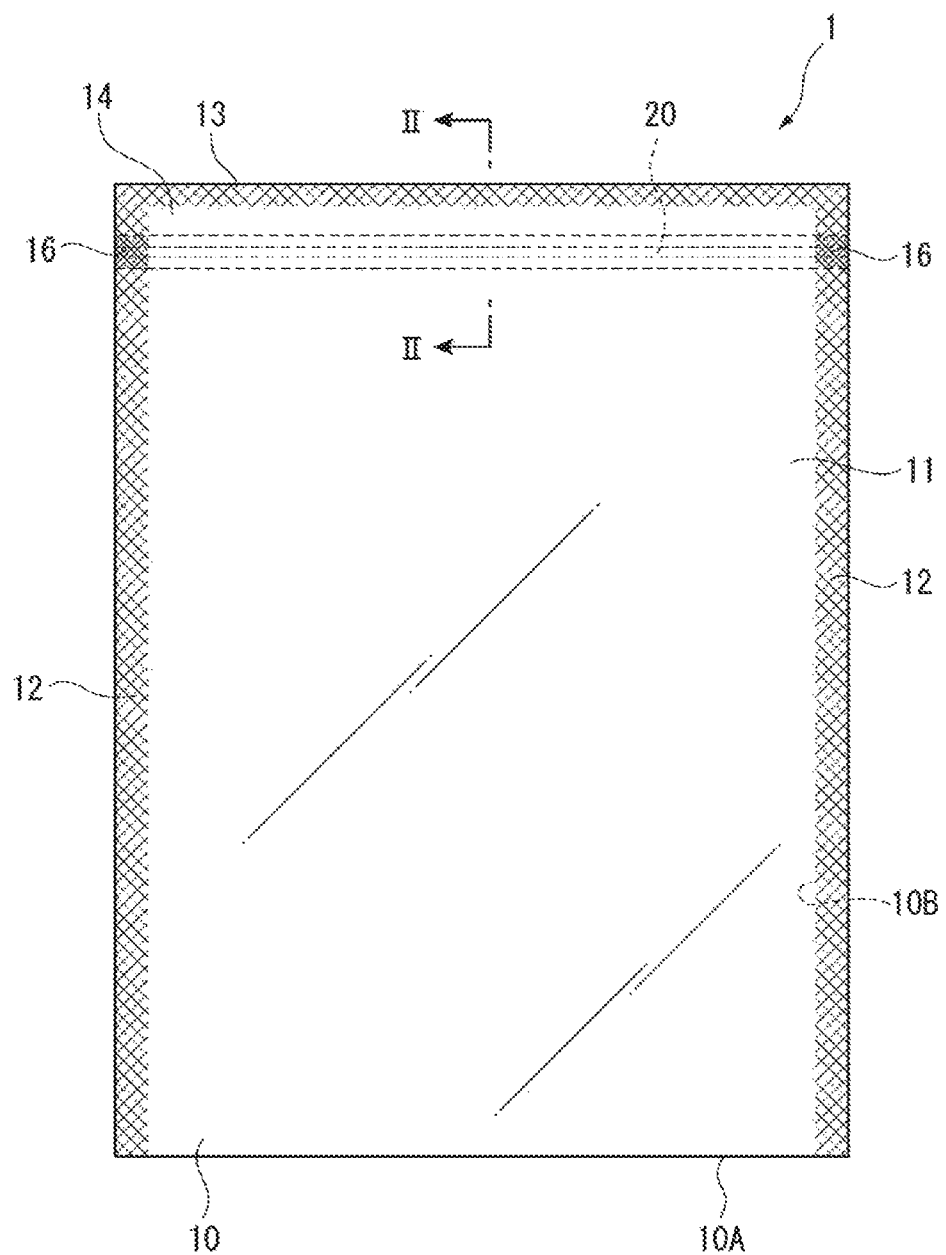
FIG. 1 is a front elevational view showing a zipper-tape bag according to a first exemplary embodiment of the invention.
Figure 2:
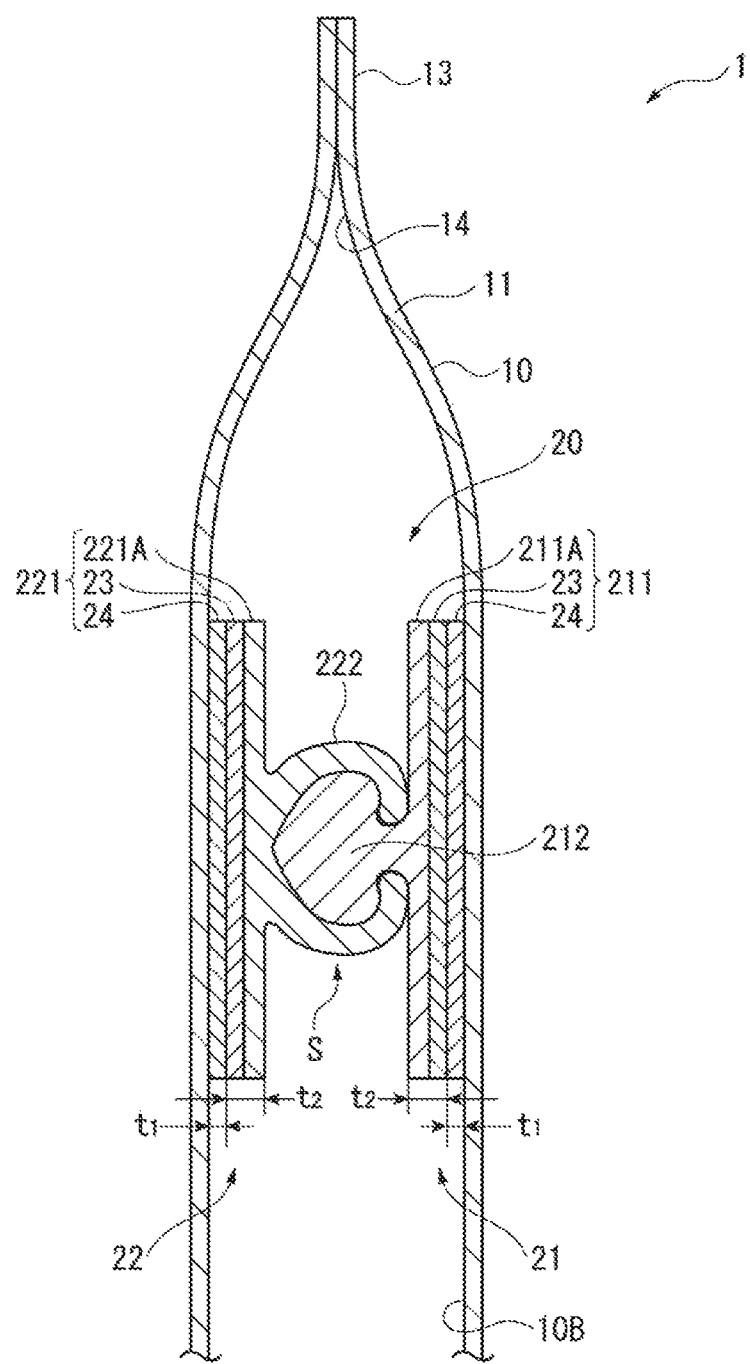
FIG. 2 is a cross-sectional view viewed as indicated by II-II in FIG. 1.

FIG. 1 is a front elevational view showing a zipper-tape bag according to the first exemplary embodiment. FIG. 2 is a cross sectional view of the zipper-tape bag seen at the position as indicated by II-II in FIG. 1.

Arrangement of Zipper-Tape Bag

As shown in FIGS. 1 and 2, the zipper-tape bag according to the first exemplary embodiment includes a bag body 10 and a zipper tape 20 attached to an inner surface of the bag body 10.

The bag body 10 is shaped into a bag by: layering two sheets of base film 11 (packaging material film); and sealing three sides of the sheets of layered base film 11. The bag body 10 has a top seal 13, a pair of side seals 12 at a periphery thereof, and an input opening 10A at a non-sealed side, through which contents are to be put in. A zipper tape 20 is attached to an inner surface of a to-be-unsealed portion 14 of the bag body 10. Further, crushed portions 16, at which the zipper tape 20 is crushed, are formed at both longitudinal ends of the zipper tape 20 corresponding to the side seals 12.

It should be noted that, after contents (not shown) are packed through the input opening 10A of the bag body 10, the bottom side of the bag body 10 is sealed to provide the zipper-tape bag in a hermetic condition.

Examples of the material of the base film 11 include: a linear low-density polyethylene (LLDPE), a high-density polyethylene (HDPE), a cast polypropylene (CPP), and laminated films laminated by dry lamination or extrusion lamination such as a polyethylene terephthalate (PET)/LLDPE, a PET/CPP, a biaxially oriented polypropylene (OPP)/CPP, a nylon/linear low-density polyethylene (LLDPE) and a metal- or an inorganic-substance vapor deposited PET/LLDPE. The base film 11 may further be, in addition to a layered structure in which a sealant layer 11C of a cast polypropylene (CPP) is layered on an outer layer 11B of an oriented polypropylene (OPP), a laminated film of a sealant layer and a base material that are adhered using dry lamination or extrusion lamination, the sealant layer being made of linear low-density polyethylene (LLDPE), low-density polyethylene (LDPE), high-density polyethylene (HDPE) and the like, the base material being made of polyethylene terephthalate (PET), nylon (polyamide), metal- or inorganic-substance vapor deposited PET and the like.

As shown in the cross section shown in FIG. 2, the zipper tape 20 includes a male member 21 and a female member 22 that are paired. The male member 21 and the female member 22 are separated and engaged to open/reclose the to-be-unsealed portion 14 of the bag body 10.

The male member 21 includes a longitudinal male belt-shaped base 211 (a bondable portion bondable to the base film 11) and a male portion 212 longitudinally provided on one side of the male belt-shaped base 211 substantially at the center in a width direction. The male portion 212 has a substantially arrowhead cross section.

The female member 22 includes a longitudinal female belt-shaped base 221 (a bondable portion bondable to the base film 11) and a female portion 222 longitudinally provided on one side of the female belt-shaped base 221 substantially at the center in a width direction. The female portion 222 is configured to be engaged with the male portion 212. The male portion 212 and the female portion 222 define an engagement portion S.

The male belt-shaped base 211 has a layered structure including: a belt-shaped male base portion 211A that is continuous and integrated with the male portion 212; a light-absorbing layer 23 layered on a side of the male base portion 211A opposite the side on which the male portion 212 is provided; and a bonding layer 24 layered on the light-absorbing layer 23.

The female belt-shaped base 221 has a layered structure including: a belt-shaped female base portion 221A that is continuous and integrated with the female portion 222; the light-absorbing layer 23 layered on a side of the female base portion 221A opposite the side on which the female portion 222 is provided; and the bonding layer 24 layered on the light-absorbing layer 23.

The male portion 212, the male base portion 211A, the female portion 222 and the female base portion 221A have compositions capable of transmitting laser beam X (see FIG. 3) (i.e. energy beam) applied thereon and not likely to be melted by the laser beam X. Specifically, it is preferable that the male portion 212, the male base portion 211A, the female portion 222 and the female base portion 221A are made up of compositions whose wavelength absorption range is not present in a range from 800 nm to 1200 nm. More specifically, resins such as various polyethylenes, various polypropylenes, polyethylene terephthalate, biaxially oriented nylon film (ONy), and ethylene-vinylalcohol copolymer are usable.

Especially, various polyethylenes and various polypropylenes are preferable in terms of their major use in general-purpose zipper tapes.

The light-absorbing layer 23 contains a light-absorbing material mixed in a resin composition, the wavelength absorption range of the light-absorbing material being in a range from 800 nm to 1200 nm.

The light-absorbing material is at least one of an organic compound and an inorganic compound, of which wavelength absorption range is in a range from 800 nm to 1200 nm, capable of absorbing the laser beam X.

At least one compound selected from the group consisting of phthalocyanine compounds, cyanine compounds, aminium compounds, imonium compounds, squarylium compounds, polymethine compounds, anthraquinone compounds, and azo compounds is usable as the organic compound.

At least one substance selected from the group consisting of an element metal, a metal salt, a metal complex, a metal nitride, a metal oxide, and a metal hydroxide is usable as the inorganic compound.

Especially, a use of carbon black capable of substantially totally absorbing light is preferable.

Various polyethylenes, various polypropylenes, polyethylene terephthalate, biaxially oriented nylon film (ONy), and ethylene-vinylalcohol copolymer are usable as the resin composition in which the light-absorbing material is contained.

Especially, various polyethylenes and various polypropylenes are preferable in terms of their major use in general-purpose zipper tapes.

The bonding layer 24 may be made of various resin materials, of which wavelength absorption range is in a range from 800 nm to 1200 nm, capable of transmitting the laser beam X. The bonding layer 24 is melted by a heat generated by the light-absorbing layer 23 receiving the laser beam X transmitted through the bonding layer 24, and is bonded to the base film 11.

The resin material usable for the bonding layer 24 may be, for instance, a low-melting-point resin whose melting point ranges from 60 degrees C. to 120 degrees C. Specifically, a metallocene olefin produced using a metallocene catalyst is suitably usable as the resin material of the bonding layer 24. More specifically, it is preferable to contain, in the entirety of the bonding layer 24, 50 mass % or more of metallocene linear low-density polyethylene whose density is 920 kg/m$^3$ or less and whose melt flow rate (MFR) is 5 g/10 min or less. More preferably, the content of the metallocene linear low-density polyethylene ranges from 50 mass % to 99 mass %, especially preferably 70 mass % to 99 mass %.

When 50 mass % or more of the linear low-density polyethylene whose density exceeds 920 kg/m$^3$ and whose MFR exceeds 5 g/10 min is contained, adhesivity to the base film 11 becomes so poor that, even if the bonding layer 24 is bonded with the base film 11, the bonding layer 24 can be easily peeled off by hand from the base film 11. Especially, when the base film 11 is made of a polypropylene resin, it is likely that the bonding layer 24 is not favorably bonded to the base film 11.

The density of the metallocene linear low-density polyethylene is preferably in a range from 850 kg/m$^3$ to 910 kg/m$^3$, and particularly preferably 860 kg/m$^3$ to 905 kg/m$^3$. The MFR is preferably in a range from 1 g/10 min to 5 g/10 min It should be noted that the density may be measured according to JIS K 7121, while the MFR may be measured according to JIS K 7210 (at 190 degrees C., load: 21.18 N).

On the other hand, the other resin forming the bonding layer 24 is preferably a resin having excellent compatibility and/or miscibility with the above-described essential component (i.e. the specific metallocene linear low-density polyethylene) and capable of keeping excellent adhesivity with the base film 11. For instance, resins such as a metallocene linear low-density polyethylene whose density is 920 kg/m$^3$ or less and whose melt flow rate (MFR) exceeds 5.0 g/10 min, and a copolymer of propylene and an alpha-olefin copolymer having 4 to 8 carbon atoms, a Ziegler linear low-density polyethylene, and ethylene/polar vinyl copolymer whose MFR (at 190 degrees C., load: 21.18N) is preferably in a range from 0.5 g/10 min to 20 g/10 min are usable for the other resin. These resins may be singly used or may be used in combination of two or more thereof.

When the zipper tape 20 is manufactured using a co-extrusion process, if the bonding layer 24 consists solely of the metallocene linear low-density polyethylene whose melt flow rate (MFR) is 5 g/10 min or less, the resin of the bonding layer 24 may flow into the male portion 212 and the female portion 222 in the die, so that, especially, tip ends of the hooks of the female portion 222 tends to approach each other, making it difficult to extrude the zipper tape 20 in the predetermined reclosable shape. Thus, it is preferable that the metallocene linear low-density polyethylene of the bonding layer 24 whose MFR is 5 g/10 min or less is blended with a metallocene linear low-density polyethylene or a copolymer of propylene and an alpha-olefin having 4 to 8 carbon atoms with higher fluidity (i.e. having MFR of more than 5 g/10 min). With such an arrangement, the shape of the female portion 222 can be kept from being deformed.

Content of these other resins in the bonding layer 24 is preferably in a range from 1 mass % to 50 mass %, and particularly preferably in a range from 5 mass % to 40 mass %. When the content is less than 1 mass %, it sometimes occurs that the advantage of keeping the engagement portion S from being deformed cannot be exhibited. In contrast, when the content exceeds 50 mass %, low-temperature sealability is sometimes impaired. Further, especially when the base film 11 is made of a polypropylene resin, the excellent bondability with the base film 11 may sometimes be deteriorated. Thus, the content of the other resin exceeding 50 mass % is not preferable.

The copolymer of propylene and an alpha-olefin having 4 to 8 carbon atoms, which has MFR in a range from 0.5 g/10 min to 20 g/10 min, may be a copolymer of propylene and butene-1. With the above arrangement, in addition to the above-described advantages, an advantage of excellent interlayer bonding strength between the bonding layer 24 and the light-absorbing layer 23 is obtainable. The MFR of the copolymer is preferably 1 g/10 min to 10 g/10 min, particularly preferably 2 g/10 min to 8 g/10 min.

Further, as described above, the resin forming the bonding layer 24 may be a blend of 50 mass % to 99 mass % of the specific metallocene linear low-density polyethylene, and 1 mass % to 50 mass % of one of metallocene linear low-density polyethylene and a copolymer of propylene and an alpha-olefin having 4 to 8 carbon atoms, which have a density of 920 kg/m$^3$ or less and MFR of exceeding 5.0 g/10 min. The resin forming the light-absorbing layer 23 may be a random polypropylene. With the above arrangement, when the zipper tape 20 is manufactured using a co-extrusion process, the fluidities of the bonding layer 24 and the light-absorbing layer 23 become even and the extrusion rate can be made substantially equal. Thus, no excessive shear stress is applied to the random polypropylene forming the light-absorbing layer 23, thereby further favorably keeping the shape of the engagement portion S from being deformed.

The content of the ethylene component in the random polypropylene (RPP) used for the light-absorbing layer 23 is preferably in a range from 2.0 mass % to 8.0 mass %, particularly preferably in a range from 3.0 mass % to 6.0 mass %. When the content of the ethylene component in the random polypropylene is smaller than 2.0 mass %, reclosability of the engagement portion S may sometimes be deteriorated. In contrast, when the content of the ethylene component is more than 8.0 mass % and the bonding layer 24 employs typically used metallocene linear low-density polyethylene, the ethylene content in the random polypropylene of the light-absorbing layer 23 increases, resulting in an increase in the composition identical with the composition of the bonding layer 24. Thus, the melting point of the light-absorbing layer 23 is lowered to reduce the melting-point difference between the light-absorbing layer 23 and the bonding layer 24, thereby possibly causing troubles in bonding the zipper tape 20.

The melt flow rate (MFR) of the random polypropylene (RPP) is preferably in range from 3 g/10 min to 10 g/10 min, particularly preferably in range of 5 g/10 min to 9 g/10 min. When the MFR of the random polypropylene is less than 3 g/10 min, extrusion moldability of the engagement portion S, which is formed continuously and integrally with the light-absorbing layer 23, the male base portion 211A and the male portion 212 (or the female base portion 221A and the female portion 222) may be deteriorated. In contrast, when the MFR is more than 10 g/10 min, tip ends of the hooks of the female portion 222 may easily approach each other and the male member 212 may be easily collapsed, which makes it difficult to extrude the engagement portion S into a predetermined reclosable shape.

The light-absorbing layer 23 and the male base portion 211A or the female base portion 221A can be provided integrally with the bonding layer 24 using a co-extrusion process. By co-extruding the zipper tape 20 as described above, the zipper tape 20 can be manufactured continuously and stably.

It should be noted that it is only necessary for the zipper-tape bag 1 to be opened at a position near the to-be-unsealed portion with respect to the engagement portion S formed by the male portion 212 and the female portion 222. For instance, the zipper-tape bag 1 may be configured to be easily opened by forming a notch in the base film 11 or providing a tear tape near the male portion 212 or the female portion 222.

Manufacturing Apparatus of Zipper-Tape Bag

Next, a manufacturing apparatus of the zipper-tape bag will be described below. FIG. 3 is a schematic illustration showing the manufacturing apparatus of the zipper-tape bag. FIG. 4 illustrates a bonding step in manufacturing the zipper-tape bag.

As shown in FIG. 3, the manufacturing apparatus 30 includes feeding rollers 31, 32, 33, four laser irradiation devices 34, a pair of compression rollers 35, a crushed-portion-forming device 36, a side-seal-forming device 37, a top-seal-forming device 38 and the like.

The laser irradiation devices 34 may have any configuration as long as the laser beam is absorbed by the light-absorbing layer 23 of the zipper tape 20 to melt the bonding layer 24. For instance, solid-state lasers such as a diode laser and YAG laser, liquid lasers such as a dye laser, and gas lasers such as a $CO_2$ laser are usable. It is especially preferable for the laser irradiation devices to be capable of continuously applying the laser beam X to melt the bonding layer 24.

Two of the four laser irradiation devices 34 are each configured to irradiate each of longitudinal sides of the male belt-shaped base 211 with the laser beam X. The other two of the laser irradiation devices 34 are each configured to irradiate each of longitudinal sides of the female belt-shaped base 221 with the laser beam X.

Each of the laser irradiation devices 34 is disposed so that an incident angle θ of the laser beam X with respect to the surface of the bonding layer 24 is in a range of greater than 0 degrees to 90 degrees or less, preferably in a range from 45 to 85 degrees. Especially, when the incident angle θ is smaller than 45 degrees, the irradiation energy of the laser beam X possibly may not be efficiently given to the light-absorbing layer 23. When the incident angle θ is larger than 85 degrees, due to an interference between the laser irradiation devices 34 and other component(s) of the manufacturing apparatus 30, it might take considerable time to pressure-bond the bonding layer 24 on the base film 11 using the compression rollers 35 after the laser beam X is applied. When it takes long time before the bonding layer 24 is bonded, the melted bonding layer 24 may start being cooled and solidified, thereby failing to bond the bonding layer 24 with sufficient bonding strength.

In other words, it is necessary to dispose the laser irradiation devices 34 so that the bonding layer 24 can be quickly pressure-bonded to the base film 11 before the bonding layer 24 is cooled and solidified after the laser beam X is applied to melt the bonding layer 24.

As shown in FIG. 4, a pair of spacers 39 each having a thickness corresponding to a sum of the thicknesses of the male portion 212 and the female portion 222 of the engaged zipper tape 20 are disposed between the compression rollers 35 with a gap substantially corresponding to a width of the engaged male portion 212 and female portion 222.

With the above arrangement, when zipper tape 20 interposed between the two sheets of base film 11 are pressed by the compression rollers 35, the sheets of base film 11 can be sufficiently rigidly pressure-bonded to the male belt-shaped base 211 and the female belt-shaped base 221.

It should be noted that the component used for the pressure-bonding may be a component other than the compression rollers 35 and may alternatively be an endless belt for pressure-bonding, a pressing bar for pressing or the like.

Manufacturing Method of Zipper-Tape Bag

Next, a manufacturing method of the zipper-tape bag will be described below.

Figure 5A:
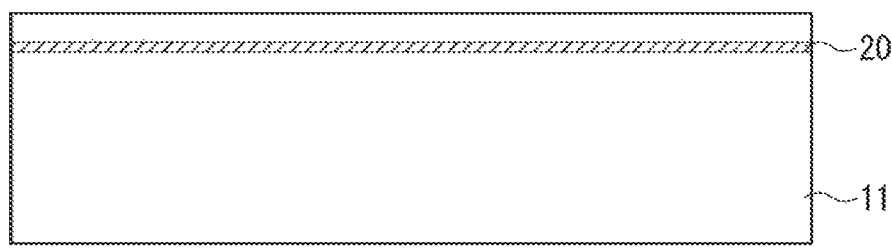
FIG. 5A is a plan view showing a step for manufacturing the zipper-tape bag, in which a zipper tape is attached to a base film.
Figure 5B:
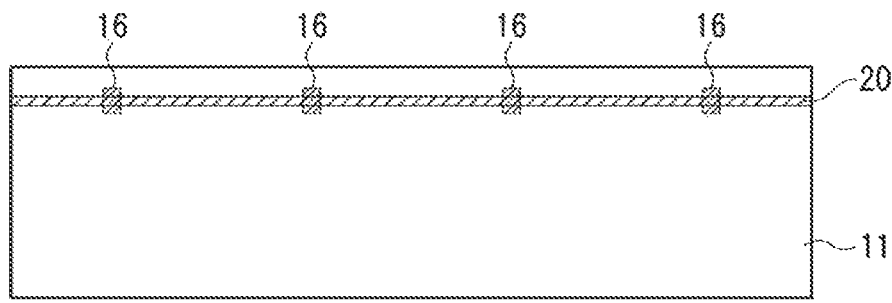
FIG. 5B is a plan view showing a step for manufacturing the zipper-tape bag, in which crushed portions are formed.
Figure 5C:
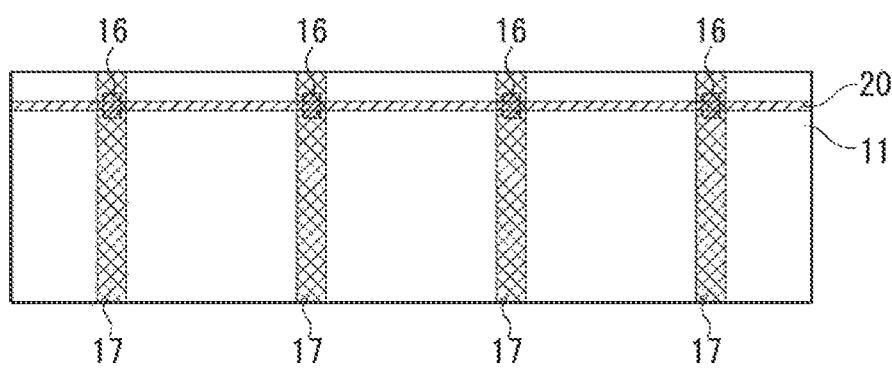
FIG. 5C is a plan view showing a step for manufacturing the zipper-tape bag, in which side seals are formed.
Figure 5D:
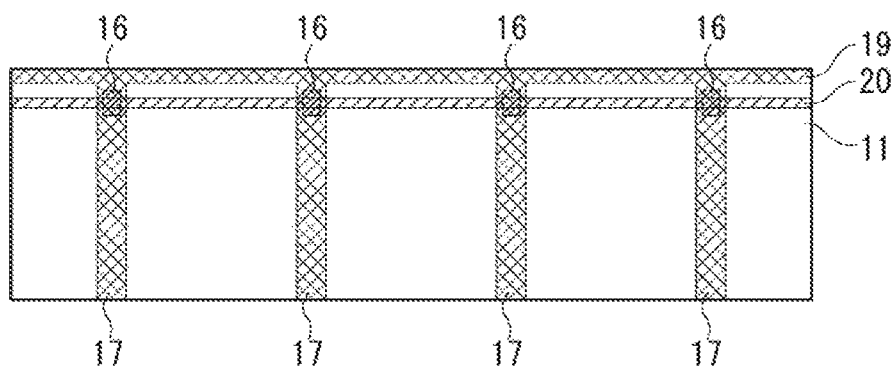
FIG. 5D is a plan view showing a step for manufacturing the zipper-tape bag, in which top seals are formed.
Figure 5E:
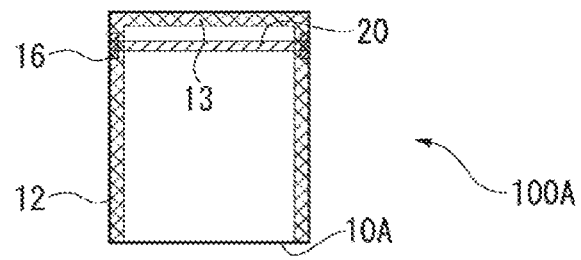
FIG. 5E is a plan view showing a step for manufacturing the zipper-tape bag and showing a resultant zipper-tape bag.

FIG. 5A is a plan view showing a step for manufacturing the zipper-tape bag, in which the zipper tape is attached to the base film. FIG. 5B is a plan view showing a step for manufacturing the zipper-tape bag, in which crushed portions are formed. FIG. 5C is a plan view showing a step for manufacturing the zipper-tape bag, in which the side seals are formed. FIG. 5D is a plan view showing a step for manufacturing the zipper-tape bag, in which the top seals are formed. FIG. 5E is a plan view showing a step for manufacturing the zipper-tape bag and showing the resultant zipper-tape bag.

Initially, the sheets of base film 11 are wound around the feeding rollers 31, 32 of the manufacturing apparatus 30 as shown in FIG. 3 and are fed in a manner facing with each other.

The zipper tape 20 is wound around the feeding roller 33 with the male member 21 and the female member 22 being engaged in advance and is fed into between the two sheets of base film 11.

Then, immediately before the zipper tape 20 is sandwiched between the compression rollers 35, the laser irradiation devices 34 apply the laser beam X on both longitudinal sides of the bonding layer 24 of the zipper tape 20 at the same time. The applied laser beam X transmits through the bonding layer 24 to reach and heat the light-absorbing layer 23. The generated heat melts the bonding layer 24 substantially uniformly in the width direction (irradiation step).

Immediately after the bonding layer 24 is melted in the irradiation step, the zipper tape 20 is sandwiched between the sheets of base film 11 using the compression rollers 35 to pressure-bond the melted bonding layer 24 to the sheets of base film 11 (bonding step). The bonding layer 24 is gradually cooled and solidified while being pressed against the sheets of base film 11 by the compression rollers 35, thereby being firmly bonded to the sheets of base film 11. The zipper tape 20 is held between and attached to the sheets of base film 11 through the bonding step as shown in FIG. 5A.

Subsequently, as shown in FIG. 5B, the zipper tape 20 attached to the sheets of base film 11 is heated to be crushed at every predetermined distances using the crushed-portion-forming device 56 to form crushed portions 16.

Then, as shown in FIG. 5C, the side-seal-forming device 37 is used to form side-dividing portions 17, which later define the side seals 12, at positions corresponding to the crushed portions 16 in a direction perpendicular to the longitudinal direction (i.e. feeding direction) of the base film 11.

Subsequently, as shown in FIG. 5D, a top-dividing portion 19, which defines the top seal 13, is formed using the top-seal-forming device 58.

Then, the sheets of base film 11 are cut along a centerline of each of the side-dividing portions 17, thereby producing the zipper-tape bag 1 with the input opening 10A being opened, as shown in FIG. 5E.

Advantages of First Exemplary Embodiment

As described above, the light-absorbing layer 23 containing the light-absorbing material having wavelength absorption range in a range from 800 nm to 1200 nm to absorb the laser beam X is provided in the first exemplary embodiment.

Accordingly, the light-absorbing material efficiently absorbs the laser beam X to be heated, so that only the bonding layer 24 adjacent to the light-absorbing layer 23 and containing the low-melting-point resin can be bonded to the base film. Therefore, thermal degradation of the sheets of base film 11 on which the zipper tape 20 is attached, and, consequently, decrease in the yield rate of the zipper-tape bag 1 to be manufactured can be prevented. Further, since only the zipper tape 20 is irradiated with the laser beam X, the energy of the laser beam X can be efficiently used to melt the bonding layer 24, thereby improving the energy efficiency. In addition, since only the bonding layer 24 is melted using the laser beam X in a form of digital signals, the melting of the bonding layer 24 and the bonding to the sheets of base film 11 can be quickly performed, thereby increasing the bag-making speed and improving production efficiency.

Figure 6:
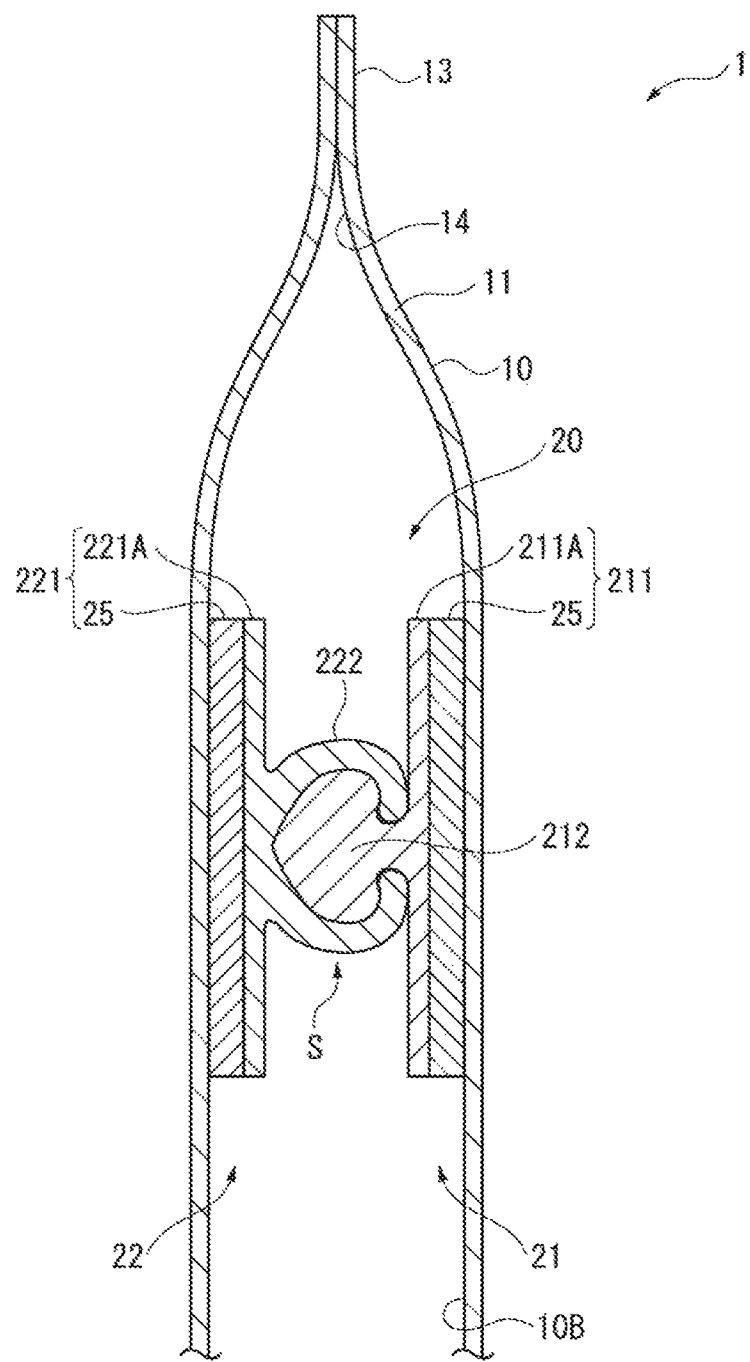
FIG. 6 is a cross sectional view of a zipper-tape bag in which conditions of the formed bag are clearly shown.

Specifically, it is confirmed that a zipper tape having a single light-absorbing bonding layer 25 instead of the separate layers of the light-absorbing layer 23 and the bonding layer 24 as shown in FIG. 6 can be bonded. Specifically, carbon black is mixed with metallocene linear low-density polyethylene having a melting point of 95 degrees C. and MFR of 4.0 g/10 min at a ratio of 1:99 to form the light-absorbing bonding layer 25 having a thickness of 25 μm. Then, a fiber laser (wavelength: 1.07 μm) is used to bond the zipper tape 20. As a result, it is found that the zipper tape 20 can be bonded at a line rate of 60 m/min (pitch 100 mm=600 shots).

Since the light-absorbing material having wavelength absorption range is in a range from 800 nm to 1200 nm to absorb the laser beam X is used in the first exemplary embodiment, the light-absorbing material efficiently absorbs the laser beam X and the bonding layer 24 adjacent to the light-absorbing layer 23 and containing the low-melting-point resin can be selectably melted.

Therefore, thermal degradation of the sheets of base film 11 on which the zipper tape 20 is attached can be restrained and the zipper tape 20 can be favorably bonded.

Especially, the bonding layer 24 uses the low-melting-point resin whose melting point ranges from 60 degrees C. to 120 degrees C., which specifically is a metallocene olefin produced using a metallocene catalyst and more specifically is metallocene linear low-density polyethylene.

Accordingly, the heat energy generated by the light-absorbing material of the light-absorbing layer 23 receiving the laser beam X irradiated thereon can be directly used to melt the low-melting-point resin of the adjacent bonding layer 24, so that the irradiation energy of the laser beam X can be efficiently used for attaching the zipper tape 20.

Further, since the bonding layer 24 is layered on the light-absorbing layer 23 and the light-absorbing layer 23 heated by being irradiated with the laser beam X melts the adjacent bonding layer 24 in the first exemplary embodiment, the entirety of the bonding layer 24 can be uniformly melted and can be favorably bonded to the sheets of base film 11. Further, since the bonding layer 24 to be melted and bonded to the sheets of base film 11 does not contain the light-absorbing material, the bondability with the base film 11 is not impaired by the light-absorbing material, thereby providing excellent bondability.

In addition, since the male portion 212, the male base portion 211A, the female portion 222, the female base portion 221A and the light-absorbing layer 23 are made of resin(s) having no absorption capability to the light of a wavelength in a range from 800 nm to 1200 nm in the first exemplary embodiment.

Thus, deformation of these components caused when these components are irradiated with laser beam X to be melted can be prevented.

Second Exemplary Embodiment

Next, a second exemplary embodiment of the invention will be described with reference to the drawings.

In the second exemplary embodiment, a single base film 11 is used to make a bag. In the second exemplary embodiment, the same or similar components as those in the first exemplary embodiments are denoted by the same reference signs and the descriptions thereof will be omitted or simplified.

Figure 7:
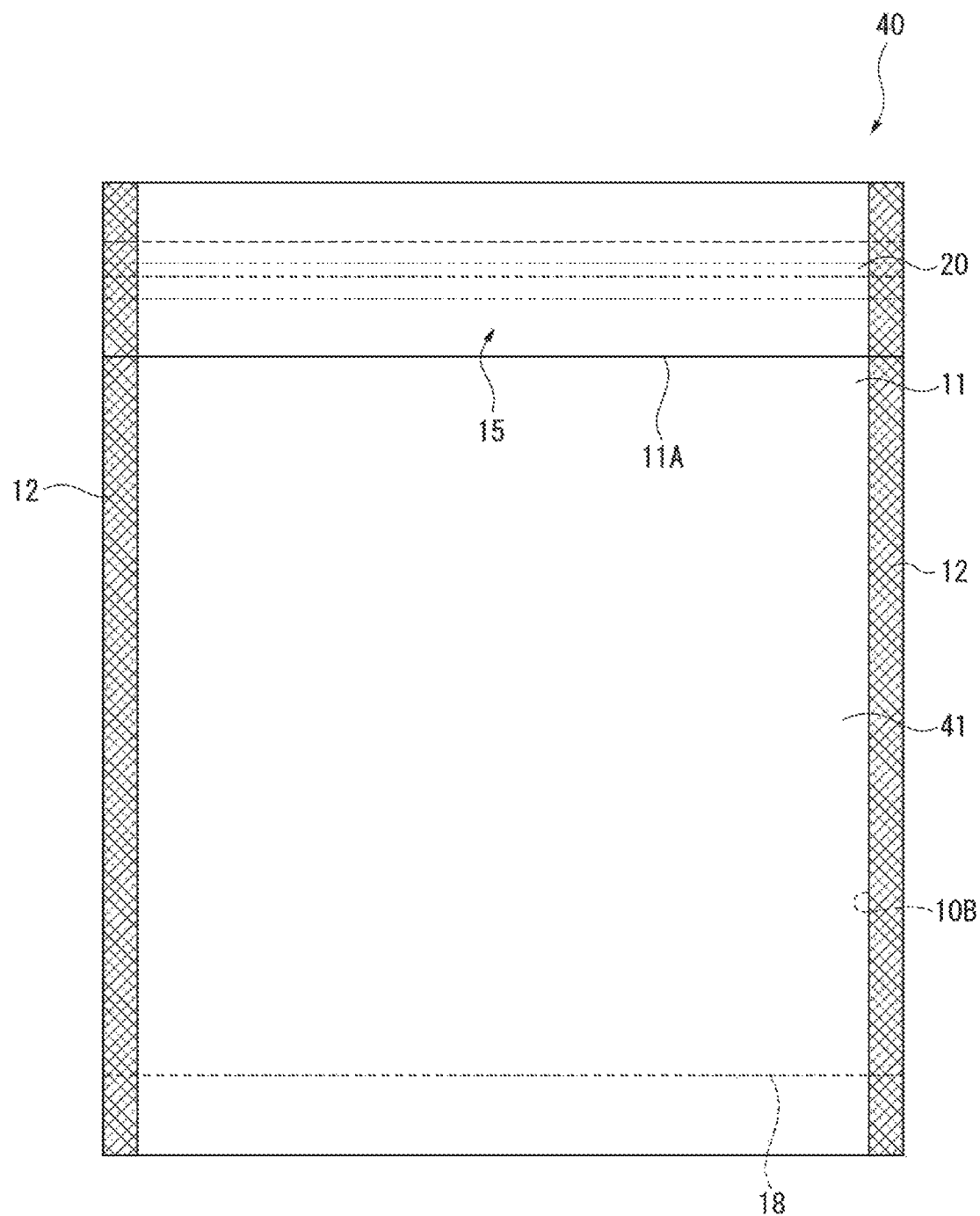
FIG. 7 is a front elevational view showing a zipper-tape bag according to a second exemplary embodiment of the invention.
Figure 8:
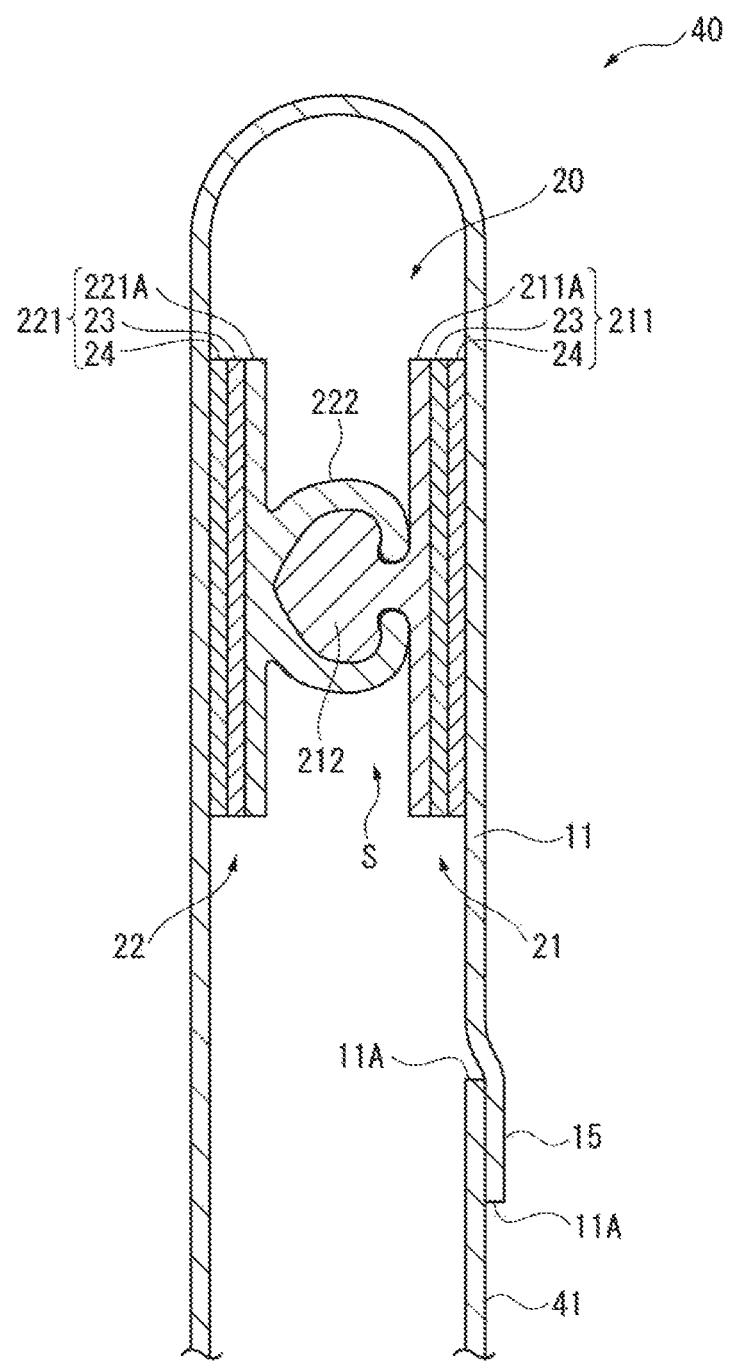
FIG. 8 is a cross sectional view of the zipper-tape bag.

FIG. 7 is a front elevational view showing the zipper-tape bag according to the second exemplary embodiment. FIG. 8 is a cross sectional view showing a part of the zipper-tape bag near the zipper tape.

Arrangement of Zipper-Tape Bag

As shown in FIGS. 7 and 8, the zipper tape 20 is attached to an inner surface of a bag body 41 of a zipper-tape bag 40.

One of the ends 11A of the base film 11 is overlapped on the other of the ends 11A to form a seal portion 15 of the bag body 41. Side seals 12 are provided by heat-sealing both lateral ends of the base film 11. Both longitudinal ends of the zipper tape 20 are each heat-sealed to each of the side seals 12.

The seal portion 15 and the side seals 12 define a containing space 10B in the bag body 41. The containing space 10B can contain solids such as powders and liquids.

A gusset 18 is formed on the bottom of the bag body 41.

Manufacturing Apparatus of Zipper-Tape Bag

Next, a manufacturing apparatus of the zipper-tape bag will be described below.

Figure 9:
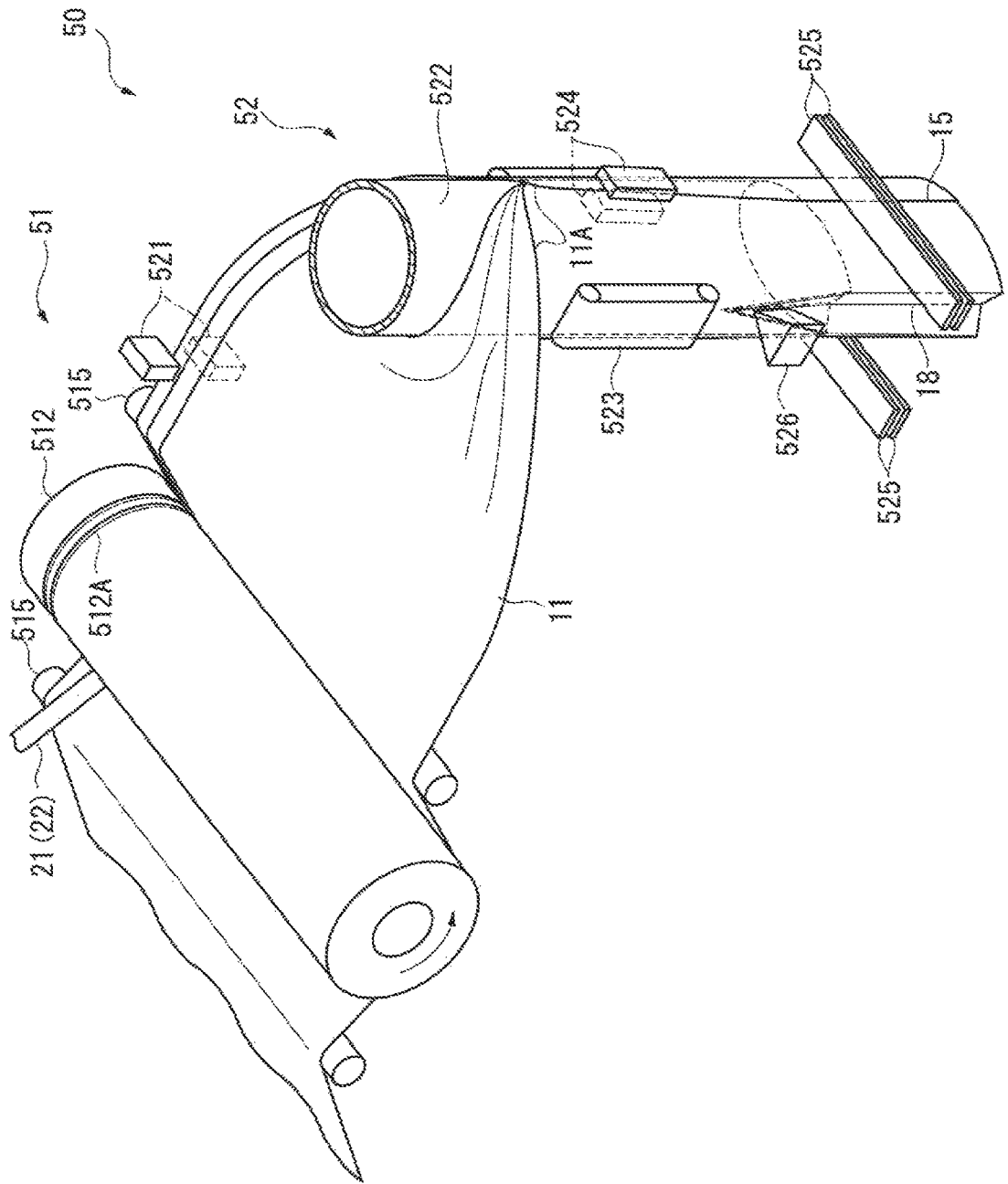
FIG. 9 is a perspective view showing a manufacturing apparatus of the zipper-tape bag.
Figure 10:
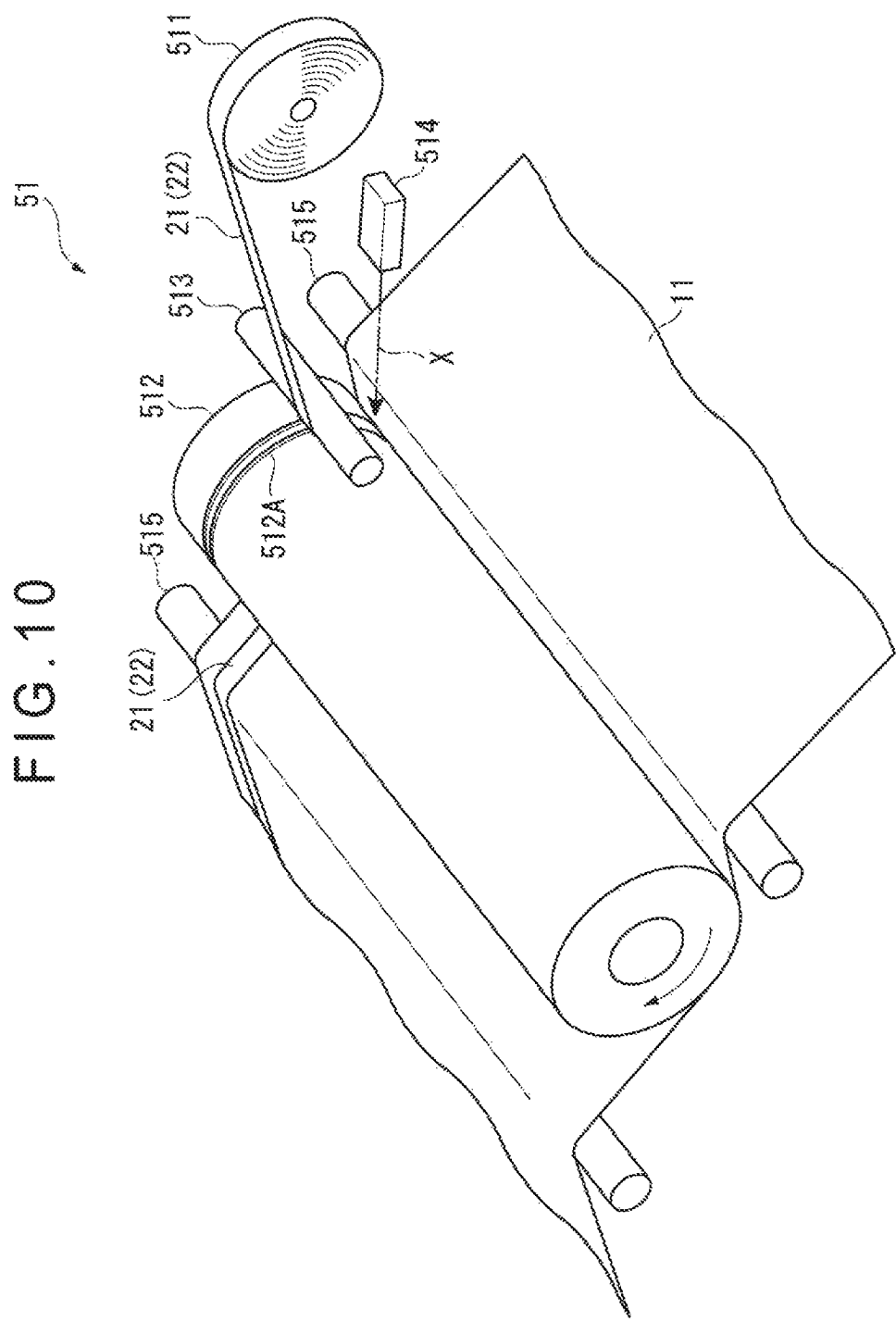
FIG. 10 is a perspective view showing a part of the manufacturing apparatus of the zipper-tape bag.
Figure 11:
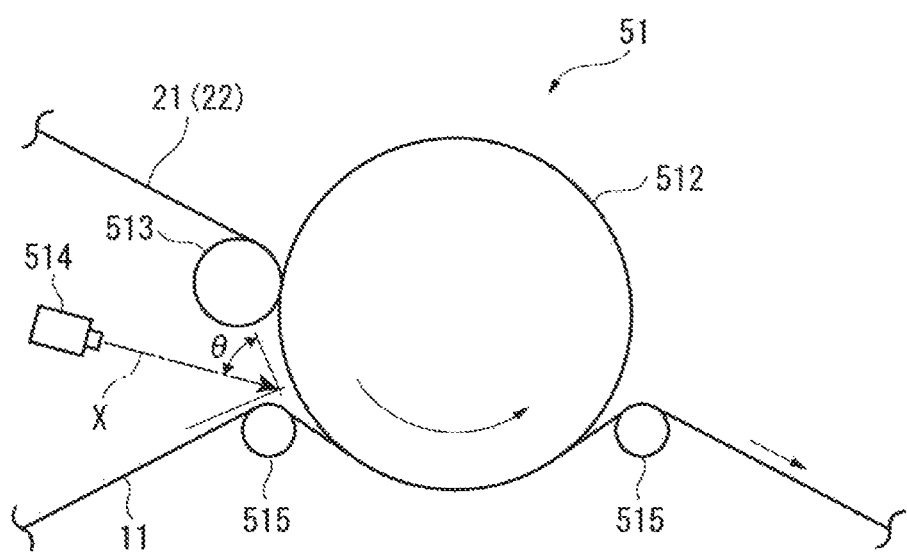
FIG. 11 is a side elevational view showing the part of the manufacturing apparatus of the zipper-tape bag.

FIG. 9 is a perspective view showing the manufacturing apparatus of the zipper-tape bag. FIG. 10 is a perspective view showing a bonding device for bonding the zipper tape to the base film in the manufacturing apparatus of the zipper-tape bag. FIG. 11 is a side elevational view showing the bonding device shown in FIG. 10. It should be noted that, for the convenience of illustration, one of the male member 21 and the female member 22 is illustrated and the other of the male member 21 and the female member 22 is not illustrated in FIGS. 9 and 10.

As shown in FIG. 9, the manufacturing apparatus 50 includes a bonding device 51 and a bag-making device 52.

The bonding device 51 includes: tape-winding rollers 511 (only one of which is shown) respectively for feeding the male member 21 and the female member 22 that are not engaged; a film-winding roller (not shown) for feeding the base film 11; a rotary drum 512 rotated by a drive source (not shown); an introduction roller 513 for introducing the fed male member 21 and the female member 22 on the circumferential surface of the rotary drum 512; a laser irradiation device 514; a compression roller 515, and the like.

Introduction grooves 512A (only one of which is shown) dented along the circumferential direction and configured to receive each of the male member 21 and the female member 22 are formed on the circumferential surface of the rotary drum 512. It should be noted that the introduction grooves 512A are not necessarily provided.

Each of the introduction grooves 512A has such a depth that the surface of the bonding layer 24 of the male member 21 or the female member 22, which is introduced by the introduction roller 513, is substantially flush with the circumferential surface of the rotary drum 512.

As shown in FIG. 11, the laser irradiation device 514 applies the laser beam X so that the laser beam X diagonally intersects the normal line on the surface of the bonding layer 24. Specifically, the laser irradiation device 514 is disposed so that the incident angle θ of the laser beam X with respect to the tangential direction of the circumferential surface of the rotary drum 512 is greater than 0 degrees and equal to or less than 90 degrees, preferably in a range from 45 degrees to 85 degrees. When the incident angle θ is smaller than 45 degrees, the irradiation energy of the laser beam X possibly may not be efficiently given to the light-absorbing layer 23. When the incident angle θ is larger than 85 degrees, due to an interference between the laser irradiation device 514 and other component(s) of the manufacturing apparatus 50, it might take considerable time to pressure-bond the bonding layer 24 on the base film 11 using the compression rollers 515 after the laser beam X is applied. When it takes long time before the bonding layer 24 is bonded, the melted bonding layer 24 starts being cooled and solidified, thereby failing to bond the bonding layer 24 with sufficient bonding strength.

It should be noted that the laser irradiation device 514 may be composed of four laser irradiation devices and may be each configured to irradiate each of longitudinal sides of the bonding layer 24 with the laser beam X. With the above arrangement, the entirety of the bonding layer 24 can be easily uniformly melted and the time required for melting the bonding layer 24 can be reduced, thereby more quickly bonding the zipper tape 20 to the base film 11.

A pair of the compression rollers 515 are configured to introduce the base film 11 to the circumferential surface of the rotary drum 512, to allow the base film 11 to continuously travel in conjunction with the rotation of the rotary drum 512 and to press the base film 11 onto the circumferential surface of the rotary drum 512. The compression rollers 515 pressure-bond the melted bonding layer 24 of each of the male member 21 and the female member 22 with the introduced base film 11.

It should be noted that the pair of compression rollers 515 may be disposed so that the base film 11 is directly introduced onto the circumferential surface of the rotary drum 512 and is pressed by the compression rollers 515 on the circumferential surface of the rotary drum 512.

As shown in FIG. 9, the bag-making device 52 includes a pair of claw-crushing bars 521, a cylindrical former 522 around which the base film 11 bonded with the zipper tape 20 is wrapped, a feed belt 523 disposed on lateral portions of the cylindrical former 522, seal bars 524 configured to bond both ends 11A of the base film 11 to form the seal portion 15, side seal bars 525 configured to form the side seals 12, and a triangle plate 526 configured to form the gusset 18.

The pair of claw-crushing bars 521 are opposed to each other with the male member 21 and the female member 22 interposed therebetween. The pair of claw-crushing bars 521 crush and melt-flatten the male member 21 and the female member 22 at every predetermined distances. The melt-flattened claw-crushed portions (not shown) are positioned correspondingly to the side seals 12 of the zipper-tape bag 40.

The cylindrical former 522 is a hollow member. The zipper-tape bag 40 is filled with contents through an inner space of the cylindrical former 522.

Manufacturing Method of Zipper-Tape Bag

Next, a manufacturing method of the zipper-tape bag will be described below.

The manufacturing method includes: an irradiation step in which the male member 21 and the female member 22 are each irradiated with the laser beam X using the bonding device 51; a bonding step in which the base film 11 is pressed against and bonded to the male member 21 and the female member 22 bonded with the bonding layer 24; and a bag-making step in which the base film 11 attached with the male member 21 and the female member 22 is shaped into a bag using the bag-making device 52.

The male member 21 and the female member 22 each drawn out from each of the tape-winding rollers 511 are held on the circumferential surface of the rotary drum 512 using the introduction rollers 513 of the bonding device 51. Specifically, the male member 21 and the female member 22 continuously travel in conjunction with the rotation of the rotary drum 512 while passing through the introduction groove 512A of the rotary drum 512. It should be noted that the rotary drum 512 is not necessarily continuously rotated but may be intermittently rotated.

Then, the irradiation step is performed, in which the laser beam X is applied to the bonding layer 24 of each of the male member 21 and the female member 22 by the laser irradiation device 514 at a position upstream of the point at which the base film 11 is supplied, thereby melting the bonding layer 24 substantially uniformly in the width direction.

Immediately after the bonding layer 24 is melted in the irradiation step, the bonding step, in which the base film 11 is introduced to the circumferential surface of the rotary drum 512 by the compression roller 515 to pressure-bond the bonding layer 24 to the male member 21 and the female member 22, is performed.

The base film 11 thus bonded with the male member 21 and the female member 22 is delivered to the bag-making device 52, at which the claw-crushed portion is formed on the male member 21 and the female member 22 by the claw-crushing bars 521.

Subsequently, the base film 11 is fed downward by the feed belt 523 while being wrapped around the cylindrical former 522. While the base film 11 is fed, the claw-crushed portion and the side seal 12 are kept aligned. While the seal portion 15 is formed by the seal bars 524, the gusset 18 is formed at a position corresponding to the bottom of the bag by the triangle plate 526.

The side seal bars 525 form one of the side seals 12. After the contents are fed through the inner space of the cylindrical former 522, the side seal bars 525 form the other of the side seals 12. Subsequently, the zipper-tape bag 40 is provided by cut-out.

Advantages of Second Exemplary Embodiment

With the arrangement of the second exemplary embodiment, the same advantages as those of the first exemplary embodiments can be attained.

Further, since the rotary drum 512 is used in the second exemplary embodiment, the laser beam X can be applied to the bonding layer 24 of each of the male member 21 and the female member 22 without causing an interference with other component(s) of the manufacturing apparatus 50, thereby facilitating the production of the manufacturing apparatus 50.

Modification(s)

The most preferable configuration for practicing the invention or the like have been disclosed above, however, the invention is not limited thereto. In other words, while the invention has been particularly explained and illustrated mainly in relation to a specific exemplary embodiment, a person skilled in the art could make various modifications in terms of materials, quantity or other particulars to the above described exemplary embodiments without deviating from the technical idea or any object of the invention.

Accordingly, the description that limits the materials and the layer structure is only an example to make the invention easily understood, but is not intended to limit the invention, so that the invention includes the description using a name of component without a part of or all of the limitation on the shape and the material etc.

For instance, though the package of each of the male belt-shaped base 211 and the female belt-shaped base 221 is a layered structure in the first exemplary embodiment, only one of the male belt-shaped base 211 and the female belt-shaped base 221 may have the layered structure.

Figure 12:
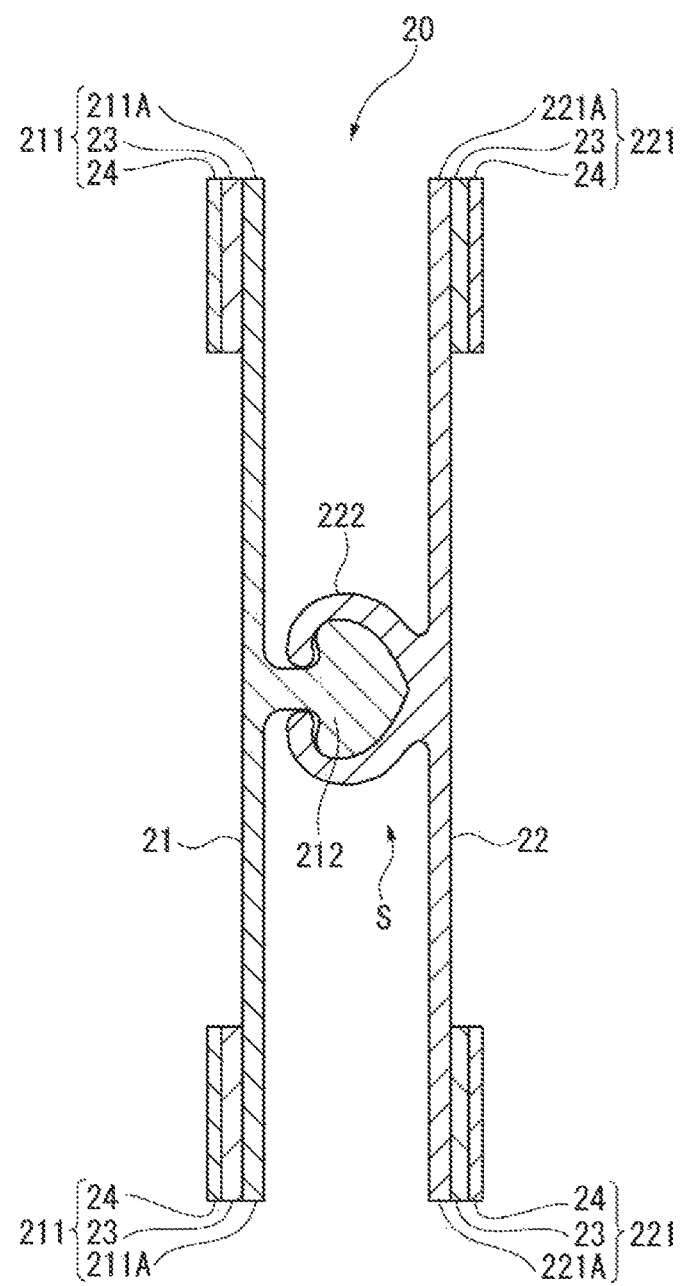
FIG. 12 is a cross sectional view showing a zipper tape according to another exemplary embodiment of the invention.

As shown in FIG. 12, only the side portions of the male belt-shaped base 211 and the female belt-shaped base 221 in the width direction on a side to be bonded with the base film 11 may have the layered structure. Further, the male belt-shaped base 211 and the female belt-shaped base 221 may have a wavy meandering shape in the longitudinal direction or may have a plurality of dots.

Figure 13:
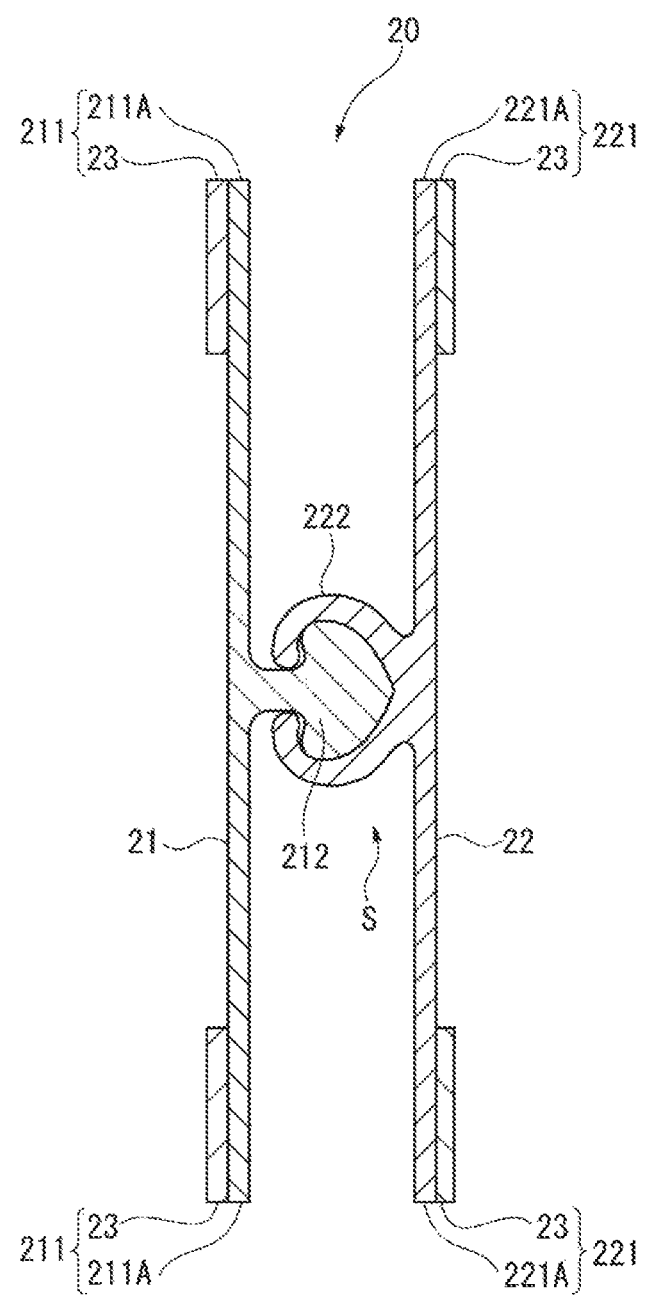
FIG. 13 is a cross sectional view showing a zipper tape according to still another exemplary embodiment of the invention.

As shown in FIG. 13, the layered structure may have no bonding layer 24 but may be in a form of the light-absorbing bonding layer 25, in which a resin of a predetermined melting point (in a range from 60 to 120 degrees C.) is contained in the light-absorbing layer 23, and the light-absorbing layer 23 may only be layered.

Alternatively, the male belt-shaped base 211 and the female belt-shaped base 221 may have different layered structures, in which one of the male belt-shaped base 211 and the female belt-shaped base 221 has the light-absorbing layer 23 and the bonding layer 24, whereas the other of the male belt-shaped base 211 and the female belt-shaped base 221 only has the light-absorbing layer 23 containing a resin of a predetermined melting point.

Further alternatively, a light-absorbing material whose wavelength absorption range is in a range from 800 nm to 1200 nm may be contained in the male belt-shaped base 211 and the female belt-shaped base 221 without providing the light-absorbing layer 23 and the bonding layer 24. In this arrangement, it is especially preferable that the engagement portion S does not contain the light-absorbing material. This is so arranged in order to reliably avoid a disadvantage of deformation of the engagement portion S and the like caused when the engagement portion S is irradiated with the laser beam X.

It should be noted that the engagement portion S may contain the light-absorbing material as long as the engagement portion S is so arranged not to be irradiated with the laser beam X.

Any resin having a melting point in a range from 60 degrees C. to 120 degrees C. may be used for the part to be melted. Further, a resin material having a melting point outside the above range may be used.

Though the pair of male member 21 and female member 22 are separately attached in the second exemplary embodiment, such an arrangement is not exhaustive. For instance, a zipper tape member integrated with the male member 21 and the female member 22 that are arranged in parallel and including a bendable portion between the male 21 and the female member 22 for bending the zipper tape member may be used, and the zipper tape member may be attached to the base film 11 with the male member 21 and the female member 22 being integrated.

The invention is applicable to various bag-making process in addition to those in the first exemplary embodiment and the second exemplary embodiment.

The laser beam X may be vertically applied onto the zipper tape 20.

The laser beam X is not necessarily applied on both sides of the zipper tape 20 but may be applied at the center in the width direction or on the entire surface of the zipper tape 20. Further, the laser beam X may be applied in a manner to scan the zipper tape in the width direction to melt an entire width of the zipper tape. In addition, it is not necessary that the laser beam X is simultaneously applied on the male member 21 and the female member 22 but the laser beam X may be alternately applied on the male member 21 and the female member 22 or applied one of the male member 21 and the female member 22 at a time.

Third Exemplary Embodiment

Next, a third exemplary embodiment of the invention will be described with reference to the drawings.

In the third exemplary embodiment, a zipper-tape bag is exemplified by a packaging bag for packaging various articles such as foods, medicines, medical products and groceries.

Figure 14:
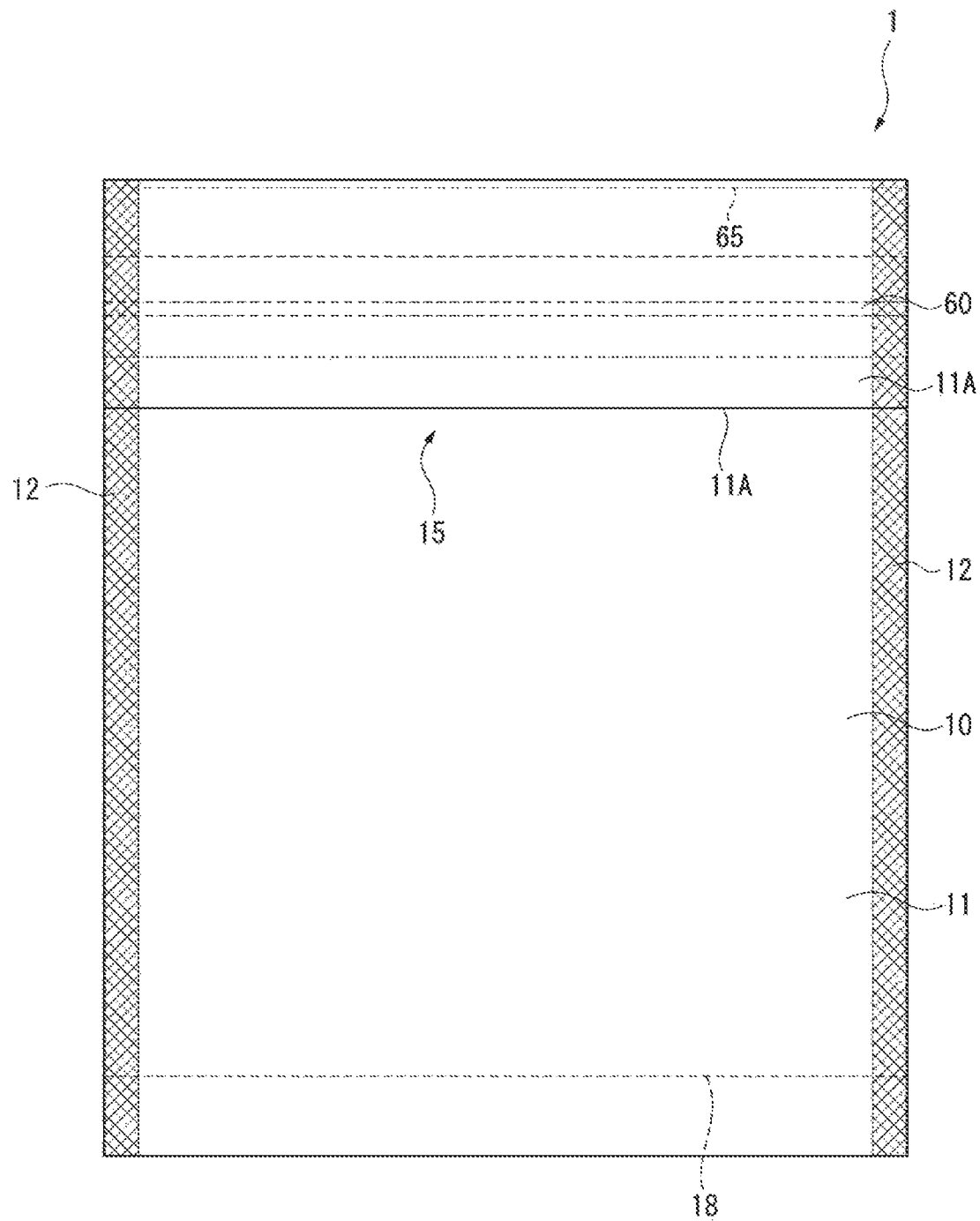
FIG. 14 is a front elevational view showing a zipper-tape bag according to a third exemplary embodiment of the invention.
Figure 15:
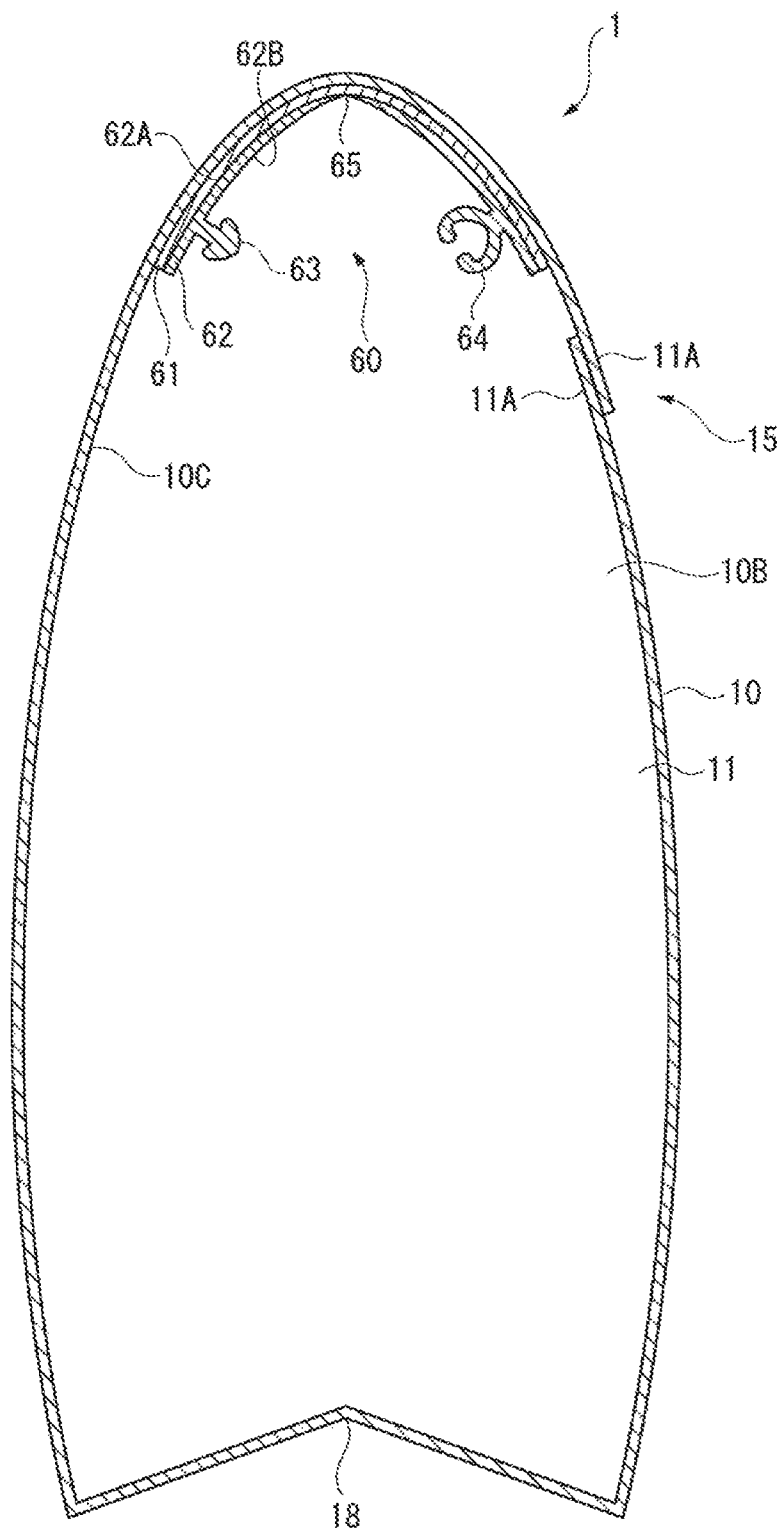
FIG. 15 is a cross sectional view of the zipper-tape bag.

FIG. 14 is a front elevational view showing the zipper-tape bag according to the third exemplary embodiment. FIG. 15 is a cross sectional view of the zipper-tape bag.

Arrangement of Zipper-Tape Bag

As shown in FIGS. 14 and 15, the zipper-tape bag 1 according to the third exemplary embodiment includes a bag body 10 made of the base film 11 (second elongated member) and a zipper tape 60 (first elongated member).

One of the ends 11A of the base film 11 is overlapped on the other of the ends 11A to form the seal portion 15 of the bag body 10. Side seals 12 are provided by heat-sealing both lateral ends of the base film 11. Each of longitudinal ends of the zipper tape 60 is heat-sealed to each of the side seals 12.

The seal portion 15 and the side seals 12 define a containing space 10B in the bag body 10. The containing space 10B can contain solids such as powders and liquids.

The gusset 18 is formed on the bottom of the base film 11.

The base film 11 has a containing surface 10C facing the containing space 10B. The zipper tape 60 is bonded (specifically, fused) on the containing surface 10C.

Examples of the material of the base film 11 include: a linear low-density polyethylene (LLDPE), a high-density polyethylene (HDPE), a cast polypropylene (CPP), and laminated films laminated by dry lamination or extrusion lamination such as a polyethylene terephthalate (PET)/LLDPE, a PET/CPP, a biaxially oriented polypropylene (OPP)/CPP, a nylon/linear low-density polyethylene (LLDPE) and a metal- or an inorganic-substance vapor deposited PET/LLDPE.

The zipper tape 60 includes a seal layer 61 (bondable portion), a belt-shaped tape layer 62 layered on the seal layer 61, a pair of male member 63 and female member 64 provided on the tape layer 62, and a bendable portion 65 provided between the male member 63 and the female member 64.

The seal layer 61 is bonded to the containing surface 10C of the base film 11. The tape layer 62 is layered on a side of the seal layer 61 facing the containing space 10B.

The tape layer 62 includes a base-facing surface 62A facing the seal layer 61, and an engaging surface 62B provided opposite the base-facing surface 62A to face the containing space 10B.

Each of the male member 63 and the female member 64 projects from the engaging surface 62B of the tape layer 62. The male member 63 and the female member 64 are engaged to form the engagement portion.

The bendable portion 65 is provided on the engaging surface 62B of the tape layer 62. The bendable portion 65 extends between one of the side seals 12 and the other thereof and substantially in parallel to a longitudinal direction of the male member 63 and the female member 64. The bendable portion 65 is located substantially at the center of the male member 63 and the female member 64 and is equidistant from the male member 63 and the female member 64.

The bendable portion 65 herein is a weakening line provided by cutting the tape layer 62 at a predetermined depth. A cross section of the cut portion has a V-shape, which may be a U-shape. Though the weakening line is a ruling line continuously formed between the longitudinal ends of the tape layer 62, the weakening line may alternatively be in a form of a ruling line cut at every predetermined distances, a perforation or a half-cut line. The predetermined depth of the cut portion refers to a dimension enough to prevent the tape layer 62 from being separated into a piece including the male member 63 and a piece including the female member 64 even when the tape layer 62 is bent. The presence of the bendable portion 65 allows the tape layer 62 to be bent so that the male member 63 and the female member 64 come close to each other.

The seal layer 61 preferably has a composition capable of absorbing the energy beam in a form of the laser beam (described later). Specifically, it is preferable that the seal layer 61 is made of a resin composition containing at least one of organic compound(s) and inorganic compound(s) capable of absorbing the laser beam.

At least one compound selected from the group consisting of phthalocyanine compounds, cyanine compounds, aminium compounds, imonium compounds, squarylium compounds, polymethine compounds, anthraquinone compounds, and azo compounds is usable as the organic compound.

At least one substance selected from the group consisting of an element metal, a metal salt, a metal complex, a metal nitride, a metal oxide, and a metal hydroxide is usable as the inorganic compound.

Especially, a use of carbon black capable of substantially totally absorbing the light is preferable.

50 mass % or more of metallocene linear low-density polyethylene whose density is 920 kg/m$^3$ or less and whose melt flow rate (MFR) is 5 g/10 min or less is contained as a resin in the entirety of the seal layer 61. More preferably, the content of the metallocene linear low-density polyethylene ranges from 50 mass % to 99 mass %, especially preferably 70 mass % to 99 mass %.

When the content of the linear low-density polyethylene whose density exceeds 920 kg/m$^3$ and whose MFR exceeds 5 g/10 min is 50 mass % or more, adhesivity to the base film 11 becomes so poor that, even when the seal layer 61 is bonded with the base film 11, the seal layer 61 can be easily peeled off by hand from the base film 11. Especially, when the base film 11 is made of a polypropylene resin, it is likely that the seal layer 61 is not favorably bonded to the base film 11.

The density of the metallocene linear low-density polyethylene is preferably 850 kg/m$^3$ to 910 kg/m$^3$, and particularly preferably 860 kg/m$^3$ to 905 kg/m$^3$. The MFR is preferably in a range from 1 g/10 min to 5 g/10 min.

It should be noted that the density may be measured according to JIS K 7121, while the MFR may be measured according to JIS K 7210 (at 190 degrees C., load: 21.18 N).

Meanwhile, other resins contained as component materials of the seal layer 61 are preferably those exhibiting good compatibility or miscibility with the above-described specific metallocene linear low-density polyethylene as an essential component material and being capable of maintaining good adhesivity with the base film 11. Examples of such resins include: a metallocene linear low-density polyethylene having a density of 920 kg/m$^3$ or less and a melt flow rate (MFR) of more than 5.0 g/10 min, and a copolymer of a propylene and an α-olefin having a carbon number of 4 to 8, Ziegler-type linear low density polyethylene and an ethylene-polar vinyl copolymer preferably having a MFR (190° C., loading: 21.18 N) of 0.5 to 20 g/10 min, which may be used alone or in combination.

When the zipper tape 60 is manufactured using a co-extrusion process, if the seal layer 61 consists solely of the metallocene linear low-density polyethylene whose melt flow rate (MFR) is 5 g/10 min or more, the resin of the seal layer 61 may flow in the male member 63 and the female member 64 in the die, so that, especially, tip ends of the hooks of the female member 64 may be easily closed, making it difficult to extrude the zipper tape 20 in the predetermined reclosable shape. Thus, it is preferable that the metallocene linear low-density polyethylene of the seal layer 61 whose MFR is 5 g/10 min or less is blended with a metallocene linear low-density polyethylene, or a copolymer of propylene and an alpha-olefin having 4 to 8 carbon atoms with higher fluidity (i.e. having MFR of more than 5 g/10 min). With such an arrangement, the shape of the female member 64 can be kept from being impaired.

Content of these other resins in the seal layer 61 is preferably in a range from 1 mass % to 50 mass %, and particularly preferably in a range from 5 mass % to 40 mass %. When the content is less than 1 mass %, it sometimes occurs that the advantage of keeping the engagement portion from being deformed cannot be exhibited. In contrast, when the content exceeds 50 mass %, low-temperature sealability is sometimes impaired. Further, especially when the base film 11 is made of a polypropylene resin, the excellent bondability with the base film 11 may sometimes be deteriorated. Thus, the content of the other resin exceeding 50 mass % is not preferable.

The copolymer of propylene and an alpha-olefin having 4 to 8 carbon atoms, which has MFR in a range from 0.5 g/10 min to 20 g/10 min, may be a copolymer of propylene and butene-1. With the above arrangement, in addition to the above-described advantages, an advantage of excellent interlayer bonding strength between the seal layer 61 and the tape layer 62 is obtainable. The MFR of the copolymer is preferably 1 g/10 min to 10 g/10 min, particularly preferably 2 g/10 min to 8 g/10 min.

It is preferable that the tape layer 62, the male member 63 and the female member 64 each have a composition capable of transmitting applied laser beam and being unlikely to be melted even when the laser beam X is applied (i.e. a composition having no absorption band in the wavelength of the laser beam X). Specifically, resins such as various polyethylenes, various polypropylenes, polyethylene terephthalate, biaxially oriented nylon film (ONy), and ethylene-vinylalcohol copolymer are usable. Especially, various polyethylenes and various polypropylenes are preferable in terms of their major use in general-purpose zipper tapes.

Further, as described above, the resins forming the seal layer 61 may be 50 mass % to 99 mass % of the specific metallocene linear low-density polyethylene, and 1 mass % to 50 mass % of one of metallocene linear low-density polyethylene and a copolymer of propylene and an alpha-olefin having 4 to 8 carbon atoms, which have a density of 920 kg/m$^3$ or less and MFR of exceeding 5.0 g/10 min. The resin forming the tape layer 62, the male member 63 and the female member 64 may be a random polypropylene. With the above arrangement, when the zipper tape 60 is manufactured using a co-extrusion process, the fluidities of the seal layer 61, the tape layer 62, the male member 63 and the female member 64 become even and the extrusion rate can be made substantially equal. Thus, no excessive shear stress is applied to the random polypropylene forming the tape layer 62, the male member 63 and the female member 64, thereby further favorably keeping the shape of the engagement portion from being impaired.

The content of the ethylene component in the random polypropylene (RPP) used for the tape layer 62, the male member 63 and the female member 64 is preferably in a range from 2.0 mass % to 8.0 mass %, particularly preferably in a range from 3.0 mass % to 6.0 mass %. When the content of the ethylene component in the random polypropylene is smaller than 2.0 mass %, reclosability of the engagement portion may sometimes be deteriorated. In contrast, when the content of the ethylene component is more than 8.0 mass % and the seal layer 61 employs typically used metallocene linear low-density polyethylene, the ethylene content in the random polypropylene of the tape layer 62 increases, resulting in an increase in the composition identical with the composition of the seal layer 61. Thus, the melting point of the tape layer 62 is lowered to reduce the difference between the melting point of the tape layer 62 and the seal layer 61, thereby possibly complicating the bonding work of the zipper tape 60.

The melt flow rate (MFR) of the random polypropylene (RPP) is preferably in range from 3 g/10 min to 10 g/10 min, particularly preferably in range of 5 g/10 min to 9 g/10 min. When the MFR of the random polypropylene is less than 3 g/10 min, extrusion moldability of the engagement portion, which is formed continuously and integrally with the tape layer 62, the male member 63 and the female member 64, may be deteriorated. On the other hand, when the MFR is more than 10 g/10 min, tip ends of the hooks of the female portion 64 may be easily closed and the male member 63 may be easily collapsed, which makes it difficult to extrude the engagement portion into a predetermined reclosable shape.

The tape layer 62, the male member 63 and the female member 64 can be obtained integrally with the seal layer 61 through a co-extrusion process. By co-extruding the zipper tape 60 as described above, the zipper tape 60 can be manufactured continuously and stably.

It should be noted that it is only necessary for the zipper-tape bag 1 to be opened at a position near the to-be-unsealed portion with respect to the engagement portion formed by the male member 63 and the female member 64. For instance, the zipper-tape bag 1 may be configured to be easily opened by forming a notch in the base film 11 or providing a tear tape near the male member 63 or the female member 64.

Manufacturing Apparatus of Zipper-Tape Bag

Next, a manufacturing apparatus of the zipper-tape bag will be described below.

Figure 16:
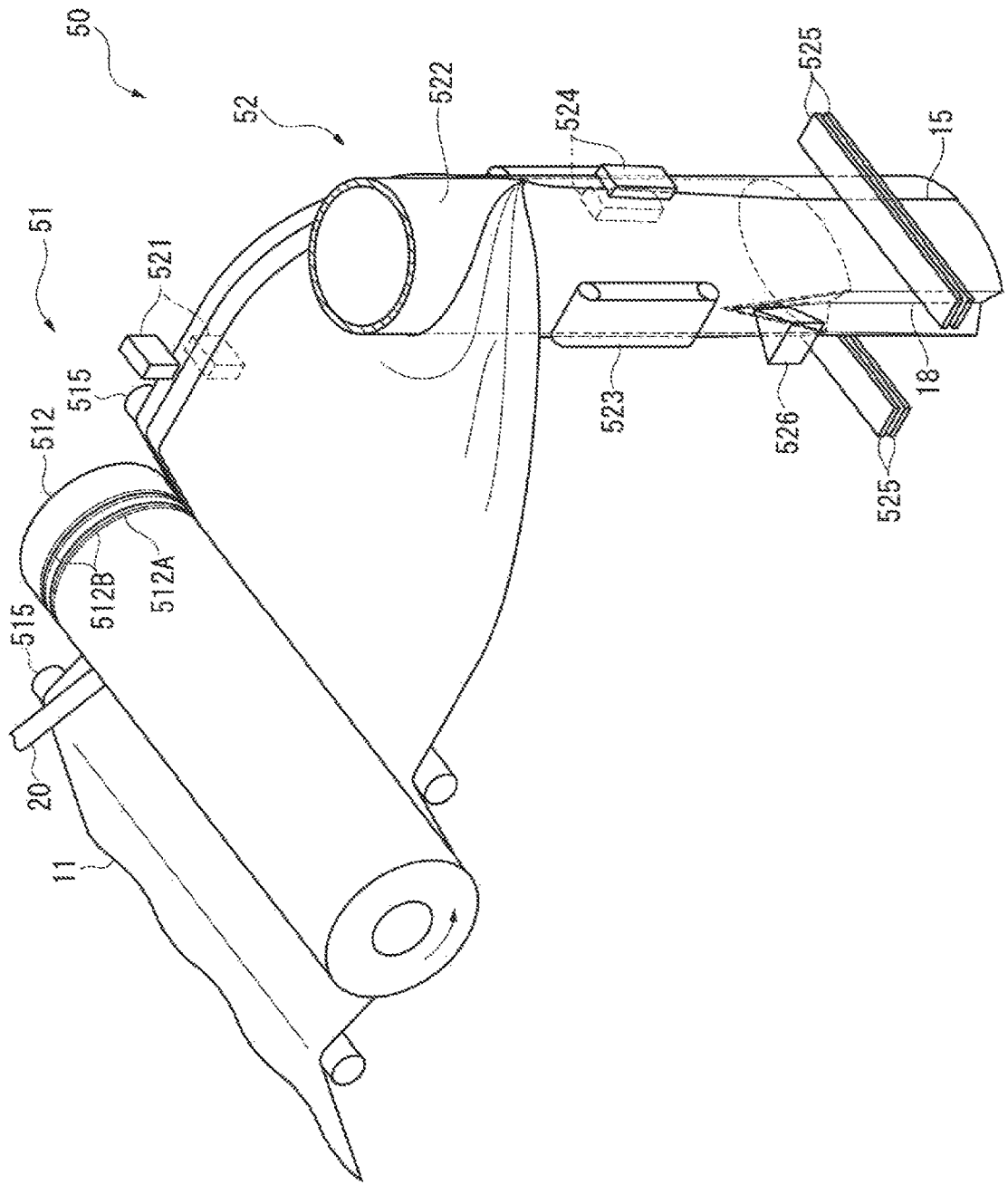
FIG. 16 is a perspective view showing a manufacturing apparatus of the zipper-tape bag.
Figure 17:
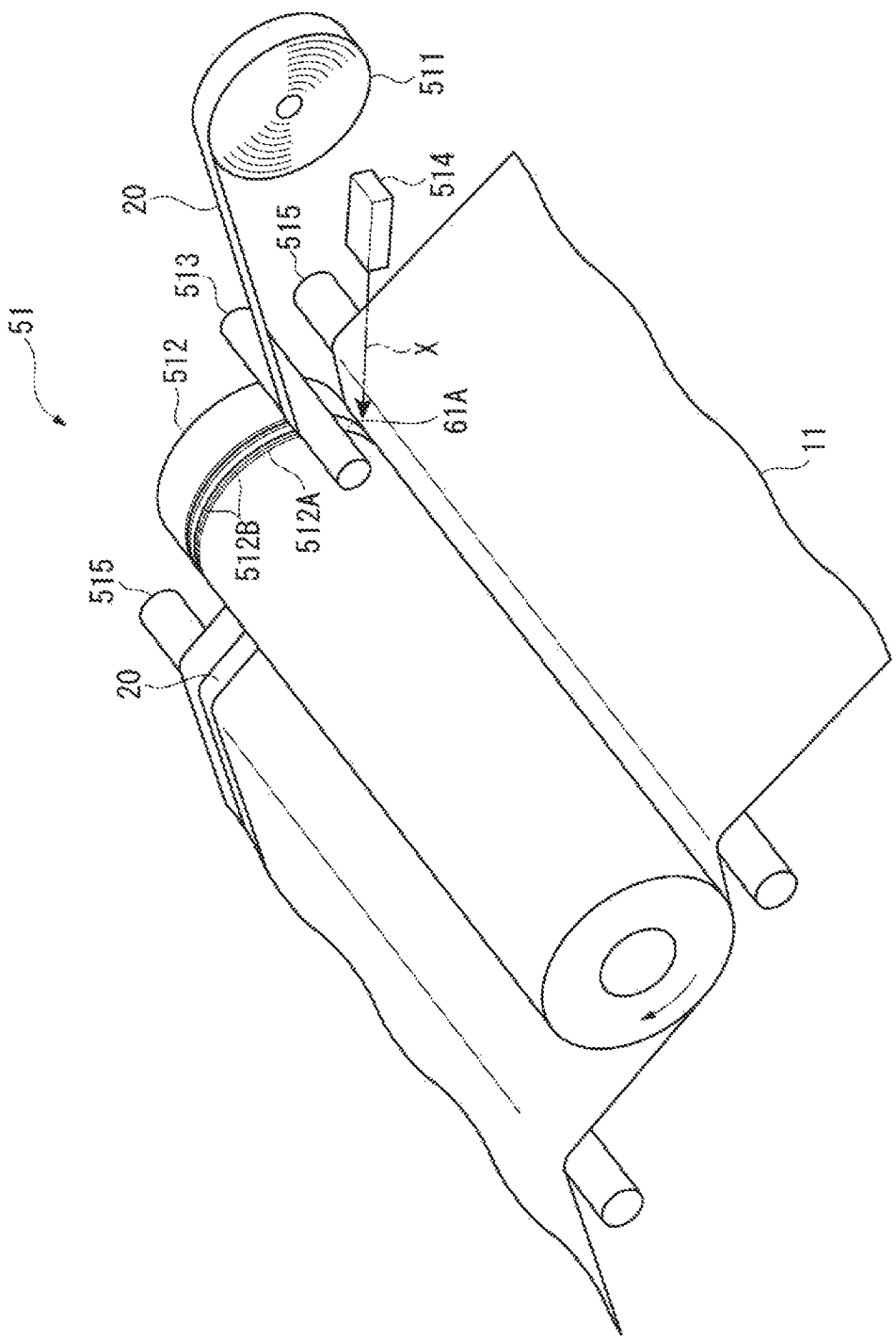
FIG. 17 is a perspective view showing a part of the manufacturing apparatus of the zipper-tape bag.
Figure 18:
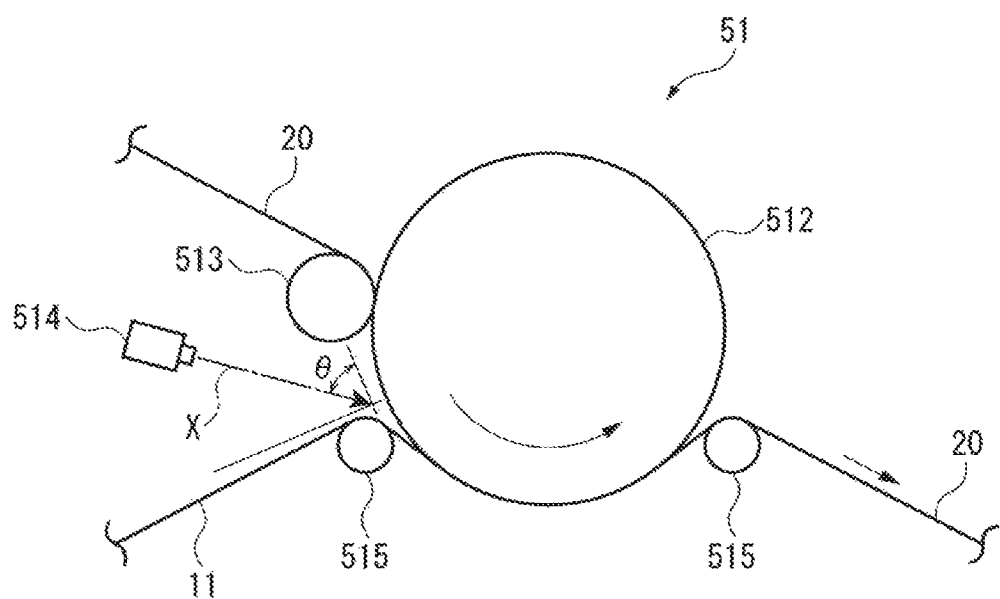
FIG. 18 is a side elevational view showing the part of the manufacturing apparatus of the zipper-tape bag.

FIG. 16 is a perspective view showing the manufacturing apparatus of the zipper-tape bag. FIG. 17 is a perspective view showing a bonding device for bonding the zipper tape to the base film in the manufacturing apparatus of the zipper-tape bag. FIG. 18 is a side elevational view showing the bonding device shown in FIG. 17. It should be noted that, for the convenience of illustration, the male member 63 and the female member 64 are not illustrated in FIGS. 16 and 17.

As shown in FIG. 16, the manufacturing apparatus 30 includes the bonding device 51 and the bag-making device 52.

The bonding device 51 includes: a tape-winding roller 511 for feeding the belt-shaped zipper tape 60 having the bendable portion 65 between the male member 63 and the female member 64 that are not engaged; a film-winding roller (not shown) for feeding the single-layered or multi-layered synthetic-resin base film 11; the rotary drum 512 (roller) rotated by a drive source (not shown); the introduction roller 513 for introducing the fed zipper tape 60 on the circumferential surface of the rotary drum 512; the laser irradiation device 514 (irradiator); the compression rollers 515 (pressure-bonder), and the like.

An introduction grooves 512A dented along the circumferential direction and configured to receive the zipper tape 60 is formed on the circumferential surface of the rotary drum 512.

The introduction groove 512A has a depth for the surface of the seal layer 61 of the zipper tape 60, which is introduced by the introduction roller 513, to be substantially flush with the circumferential surface of the rotary drum 512. Two engagement grooves 512B for respectively receiving and guiding the male member 63 and the female member 64 are formed in the introduction groove 512A. The engagement grooves 512B are deeper than the projection heights of the male member 63 and the female member 64.

The laser irradiation device 514 may have any configuration as long as the laser irradiation device 514 can melt the surface of the seal layer 61 of the zipper tape 60 (i.e. the bonding surface 61A defining the bondable portion with the base film 11). For instance, solid-state lasers such as a diode laser and YAG laser, liquid lasers such as a dye laser, and gas lasers such as a $CO_2$ laser are usable. It is especially preferable for the laser irradiation device to be capable of continuously applying the laser beam X to melt the bonding surface 21A.

As shown in FIG. 18, the laser irradiation device 514 applies the laser beam X so that the laser beam X diagonally intersects the normal line on the surface of the bonding surface 61A. Specifically, the laser irradiation device 514 is disposed so that the incident angle θ of the laser beam X with respect to the tangential direction of the circumferential surface of the rotary drum 512 is greater than 0 degrees and equal to or less than 90 degrees, preferably in a range from 45 degrees to 85 degrees. When the incident angle θ is smaller than 45 degrees, the irradiation energy of the laser beam X possibly may not be efficiently given to the bonding surface 61A. When the incident angle θ is larger than 85 degrees, due to an interference between the laser irradiation device 514 and other component(s) of the manufacturing apparatus 50, it might take considerable time to pressure-bond the bonding surface 61A on the base film 11 using the compression rollers 515 after the laser beam X is applied. When it takes long time before the bonding surface 61A is bonded, the melted bonding surface 61A starts being cooled and solidified, thereby failing to bond the bonding surface 61A with sufficient bonding strength.

In other words, it is necessary to dispose the laser irradiation device 514 so that the bonding surface 61A can be quickly pressure-bonded to the base film 11 before the bonding surface 61A is cooled and solidified after the laser beam X is applied to melt the bonding surface 61A.

It should be noted that the laser irradiation device 514 may be composed of two laser irradiation devices and may be each configured to irradiate each of longitudinal sides of the seal layer 61 with the laser beam X. With the above arrangement, the entirety of the seal layer 61 can be easily uniformly melted and the time required for melting the seal layer 61 can be reduced, thereby more quickly bonding the zipper tape 60 to the base film 11.

A pair of the compression rollers 515 are configured to introduce the base film 11 to the circumferential surface of the rotary drum 512, to allow the base film 11 to continuously travel in conjunction with the rotation of the rotary drum 512 and to press the base film 11 onto the circumferential surface of the rotary drum 512. The compression rollers 515 pressure-bond the melted seal layer 61 of the zipper tape 60 with the introduced base film 11.

Figure 19:
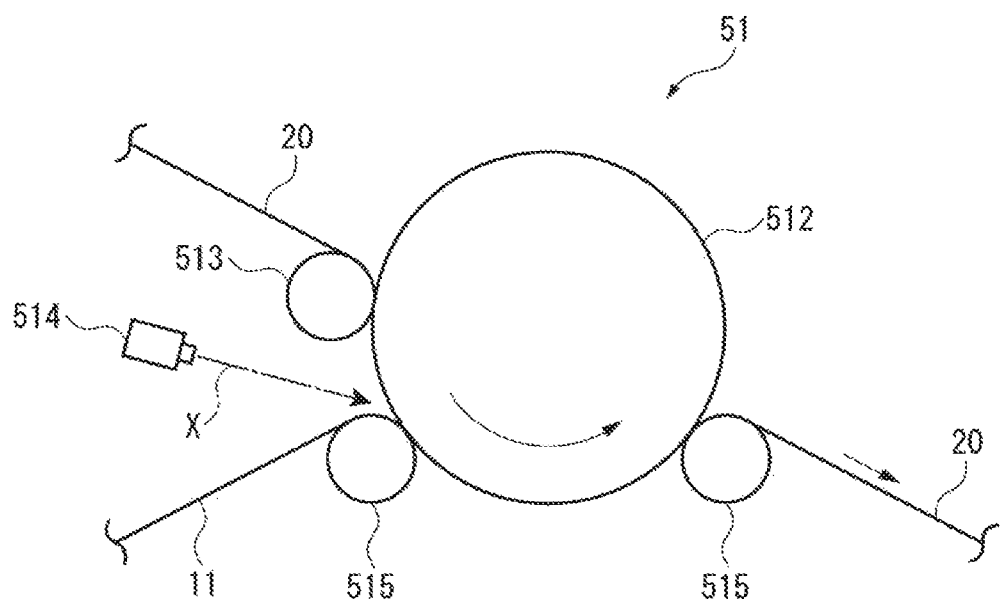
FIG. 19 is a side elevational view showing a modification of the manufacturing apparatus shown in FIG. 18.

It should be noted that the pair of compression rollers 515 may be disposed so that the base film 11 is directly introduced onto the circumferential surface of the rotary drum 512 and is pressed by the compression rollers 515 on the circumferential surface of the rotary drum 512, as shown in, for instance, FIG. 19.

As shown in FIG. 16, the bag-making device 52 includes a pair of claw-crushing bars 521, a cylindrical former 522 around which the base film 11 bonded with the zipper tape 60 is wrapped, a feed belt 523 disposed on lateral portions of the cylindrical former 522, seal bars 524 configured to bond both ends of the base film 11 to form the seal portion 15, side seal bars 525 configured to form the side seals 12, and a triangle plate 526 configured to form the gusset 18.

The pair of claw-crushing bars 521 are opposed to each other with the zipper tape 60 interposed therebetween. The pair of claw-crushing bars 521 crush and melt-flatten the male member 63 and the female member 64 at every predetermined distances. The melt-flattened claw-crushed portion (not shown) is positioned correspondingly to the side seal 12 of the zipper-tape bag 1.

The cylindrical former 522 is a hollow member. The contents is fed into the zipper-tape bag 1 through an inner space of the cylindrical former 522.

Manufacturing Method of Zipper-Tape Bag

Next, a manufacturing method of the zipper-tape bag will be described below.

The manufacturing method includes: an irradiation step in which the seal layer 61 of the zipper tape 60 is irradiated with the laser beam X using the bonding device 51; a bonding step in which the base film 11 is pressed against and bonded to the zipper tape 60 fused with the seal layer 61; and a bag-making step in which the base film 11 attached with the zipper tape 60 is shaped into a bag using the bag-making device 52.

The zipper tape 60 drawn out from the tape-winding roller 511 is held on the circumferential surface of the rotary drum 512 using the introduction rollers 513 of the bonding device 51. Specifically, the zipper tape 60 continuously travels in conjunction with the rotation of the rotary drum 512 while passing through the introduction groove 512A of the rotary drum 512.

Then, the irradiation step is performed, in which the laser beam X is applied to the bonding surface 61A of the zipper tape 60 by the laser irradiation device 514 at a position upstream of the point at which the base film 11 is supplied, thereby melting the bonding surface 61A substantially uniformly in the width direction.

Immediately after the bonding surface 61A is melted in the irradiation step, the bonding step, in which the base film 11 is introduced to the circumferential surface of the rotary drum 512 to pressure-bond the base film to the zipper tape 60 by the compression rollers 515, is performed.

The base film 11 thus bonded with the zipper tape 60 is delivered to the bag-making device 52, at which the claw-crushed portion is formed on the male member 63 and the female member 64 of the zipper tape 60 by the claw-crushing bars 521.

Subsequently, the base film 11 is fed downward by the feed belt 523 while being wrapped around the cylindrical former 522. While the base film 11 is fed, the claw-crushed portion and the side seal 12 are kept aligned. While the seal portion 15 is formed by the seal bars 524, the gusset 18 is formed at a position corresponding to the bottom of the bag by the triangle plate 526.

The side seal bars 525 form one of the side seals 12. After the contents are fed through the inner space of the cylinder former 522, the side seal bars 525 form the other of the side seals 12. Subsequently, the zipper-tape bag 1 is provided by cut-out.

Advantages of Third Exemplary Embodiment

As described above, in the above exemplary embodiment, after the laser beam X is applied on the bonding surface 61A of the zipper tape 60 introduced on the circumferential surface of the rotary drum 512 to melt the bonding surface 61A, the base film 11 is wrapped around the rotary drum 512 and is pressed against the zipper tape 60 to be bonded to the zipper tape 60.

Thus, since the laser beam X is not applied to the base film 11, the base film 11 is kept from being damaged or deformed by the laser beam X, thereby favorably bonding the zipper tape 60. Accordingly, decrease in the yield rate of the manufactured zipper-tape bag 1 can be prevented. Further, the irradiation energy of the laser beam X can be exclusively used to melt the zipper tape 60, so that the energy efficiency can be improved and the bonding process can be efficiently performed.

In addition, since only the bonding surface 61A is melted using the laser beam X in a form of digital signals, the melting of the bonding surface 61A and the bonding to the sheets of base film 11 can be quickly performed, thereby increasing the bag-making speed and improving production efficiency. Further, the irradiation energy of the laser beam X can be efficiently used to melt the zipper tape 60, so that the zipper tape 60 can be efficiently bonded.

In the third exemplary embodiment, the laser beam X is applied on the zipper tape 60 to continuously melt the zipper tape 60 while the zipper tape 60 is received and continuously moved in the introduction groove 512A of the rotary drum 512.

Accordingly, the zipper tape 60 can be melted by the laser beam X in a short time, so that the time required for the bonding can be reduced.

Further, in the third exemplary embodiment, the depth of the introduction groove 512A is set so that the bonding surface 61A of the zipper tape 60 received in the introduction groove 512A becomes substantially flush with the circumferential surface of the rotary drum 512.

Accordingly, when the base film 11 is pressure-bonded to the zipper tape 60, the base film 11 is kept from being wrinkled or sagged, thereby favorably bonding the zipper tape 60 with the base film 11.

Further, in the third exemplary embodiment, the laser beam X is applied on the circumferential surface of the rotary drum 512 at the incident angle θ intersecting the normal line of the circumferential surface of the rotary drum 512.

Accordingly, the laser beam X can be kept from being interfered with the other component(s), so that the energy of the laser beam X can be efficiently applied to the bonding surface 61A and the seal layer 61 can be easily bonded to the base film 11 before the seal layer 61 is cooled and solidified. Further, since the laser irradiation device 514 is restrained from being interfered with the other component(s), the size of the bonding device 51 can be reduced.

Further, the seal layer 61 capable of absorbing the laser beam is provided at the portion of the zipper tape 60 to be bonded with the base film 11.

Accordingly, the energy of the laser beam can be efficiently used to melt the bonding surface 61A, so that the zipper tape 60 can be efficiently bonded with the base film 11.

Further, the parts of the zipper tape 60 other than the bonding surface 61A (i.e. the tape layer 62, the male member 63 and the female member 64) each have a composition hardly absorbing the laser beam X (i.e. a composition having no absorption band in the wavelength of the laser beam X) to transmit the laser beam X to restrain the parts of the zipper tape 60 from being melted.

Accordingly, for instance, the male member 63 and the female member 64 can be kept from being deformed to cause an engagement failure, and the tape layer 62 can be kept from being deformed to be unable to be properly bonded to the base film 11 and to wrinkle or sag the base film 11.

The zipper tape 60 for making the zipper-tape bag 1 is used for bonding with the base film 11.

Accordingly, the bag-making speed can be further accelerated. In addition, since the zipper-tape bag 1 can be efficiently made, the zipper-tape bag 1 can be inexpensively provided.

Fourth Exemplary Embodiment

Next, a fourth exemplary embodiment of the invention will be described with reference to the drawings.

In the fourth exemplary embodiment, the zipper-tape bag is manufactured using a three-side-sealed-bag making process. In the fourth exemplary embodiment, the same or similar components as those in the third exemplary embodiment are denoted by the same reference signs and the descriptions thereof will be omitted or simplified.

Figure 20:
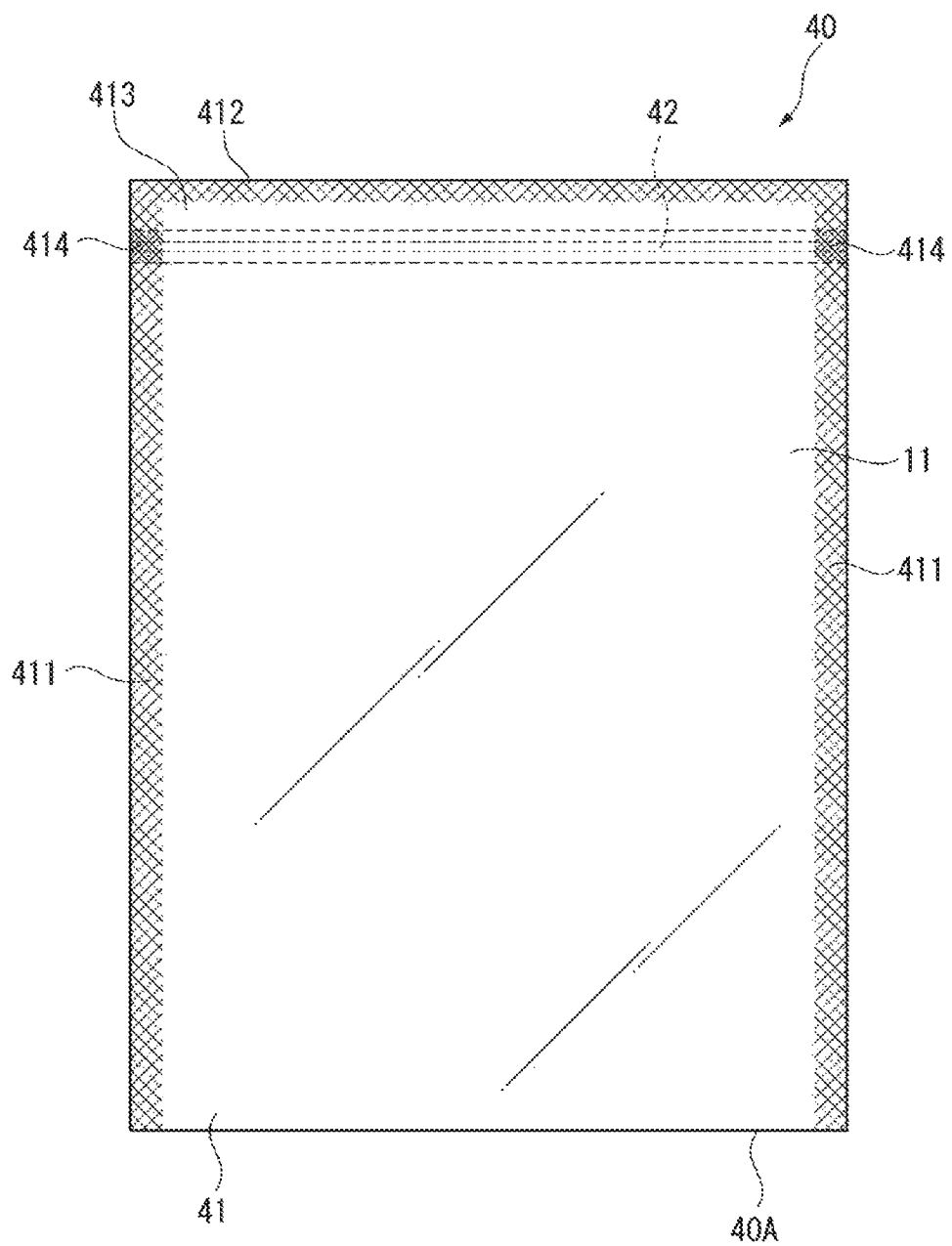
FIG. 20 is a front elevational view showing a zipper-tape bag according to a fourth exemplary embodiment of the invention.
Figure 21:
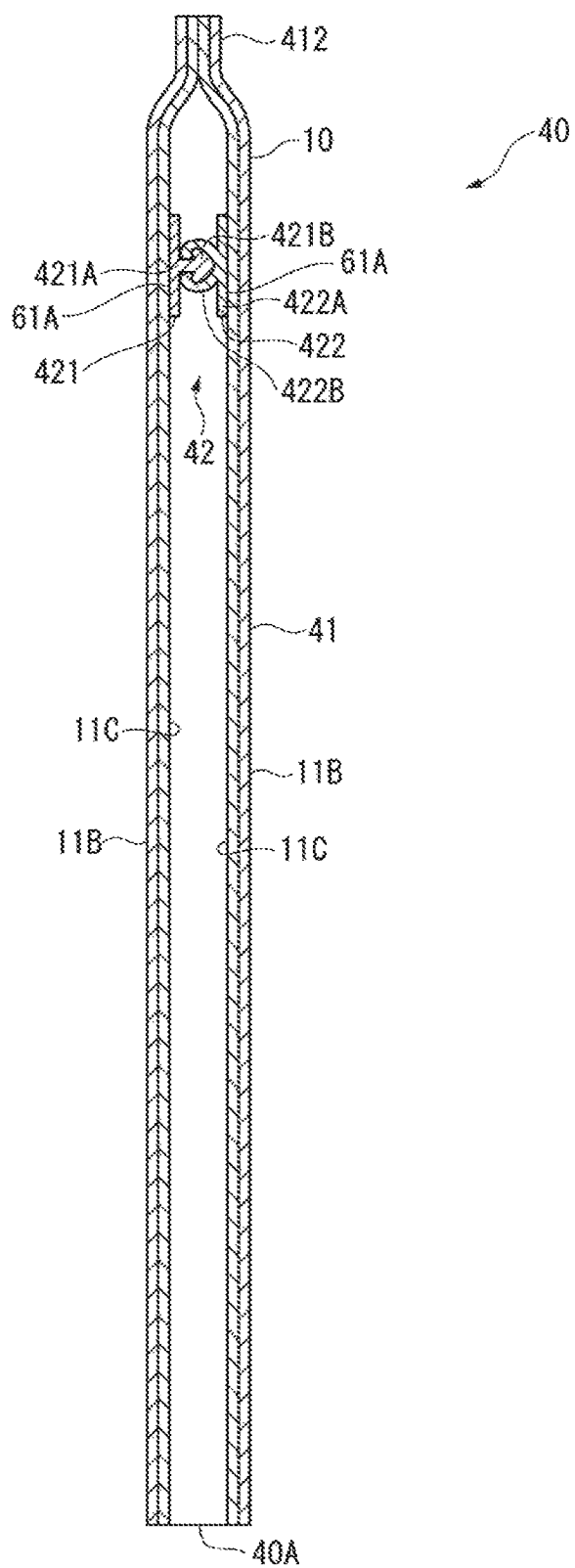
FIG. 21 is a cross sectional view of the zipper-tape bag.

FIG. 20 is a front elevational view showing the zipper-tape bag according to the fourth exemplary embodiment. FIG. 21 is a cross-sectional view showing the zipper-tape bag according to the fourth exemplary embodiment.

Arrangement of Zipper-Tape Bag

As shown in FIGS. 20 and 21, the zipper tape 42 is attached to an inner surface of the bag body 41 of the zipper-tape bag 40.

The bag body 41 is shaped into a bag by: layering two sheets of base film 11 (packaging material); and sealing three sides of the sheets of layered base film 11. The bag body 41 has a top seal 412 and a pair of side seals 411 at a periphery thereof, and an input opening 40A at a non-sealed side, through which content is to be put in. A zipper tape 42 is attached to an inner surface of a to-be-unsealed portion 413 of the bag body 41. Further, crushed portions 414, at which the zipper tape 42 is crushed, are formed at both longitudinal ends of the zipper tape 42 corresponding to the side seals 411.

It should be noted that, after contents (not shown) are fed through the input opening 40A of the bag body 41, the bottom side of the bag body 41 is sealed to provide the zipper-tape bag 40 in a hermetic condition.

The base film 11 includes, as shown in the cross section in FIG. 21 for instance, the outer layer 11B located at an exterior side of the bag body 41, and the sealant layer 11C located at an interior side of the bag body 41 and attached with the zipper tape 42. The outer layer 11B is made of, for instance, oriented polypropylene (OPP) and the sealant layer 11C is made of, for instance, cast polypropylene (CPP). The base film 11 may further be, in addition to the above, a laminated film of a sealant and a base material that are adhered using dry lamination or extrusion lamination, the sealant being made of linear low-density polyethylene (LL-DPE), low-density polyethylene (LDPE), high-density polyethylene (HDPE) or the like, the base material being made of polyethylene terephthalate (PET), nylon (polyamide), metal- or inorganic-substance vapor deposited PET or the like.

The zipper tape 42 includes a male member 421 and a female member 422 that are paired. The male member 421 and the female member 422 are separated and engaged to open/reclose the to-be-unsealed portion 413 of the bag body 41.

The male member 421 includes a longitudinal male belt-shaped base 421A (a bondable portion bondable to the base film 11) and a convex portion 421B longitudinally provided on one side of the male belt-shaped base 421A substantially at the center in a width direction, the convex portion 421B having a substantially arrowhead cross section.

The female member 422 includes a longitudinal female belt-shaped base 422A (a bondable portion bondable to the base film 11) and a concave portion 422B longitudinally provided on one side of the female belt-shaped base 422A substantially at the center in a width direction, the concave portion 422B being configured to be engaged with the convex portion 421B.

The bonding surface 61A is defined by the longitudinal belt-shaped surface of each of the male belt-shaped base 421A and the female belt-shaped base 422A to be attached to the base film 11.

It is preferable that the zipper tape 42 is configured to absorb the later-described laser beam at least at the bonding surface 61A, where, for instance, carbon black is contained or the seal layer 61 is provided. In the zipper tape 42, the convex portion 421B, the concave portion 422B and a side of each of the male belt-shaped base 421A and the female belt-shaped base 422A opposite the bonding surface 61A each have a composition capable of transmitting the applied laser beam and thus unlikely to be melted even when the laser beam is applied. In other words, it is preferable that the above parts of the zipper tape 42 have compositions having no absorption band in the wavelength of the laser beam.

Specifically, resins such as various polyethylenes, various polypropylenes, polyethylene terephthalate, biaxially oriented nylon film (ONy), and ethylene-vinylalcohol copolymer are usable. Especially, various polyethylenes and various polypropylenes are preferable in terms of their major use in general-purpose zipper tapes.

Manufacturing Apparatus of Zipper-Tape Bag

Next, a manufacturing apparatus of the zipper-tape bag will be described below.

Figure 22:
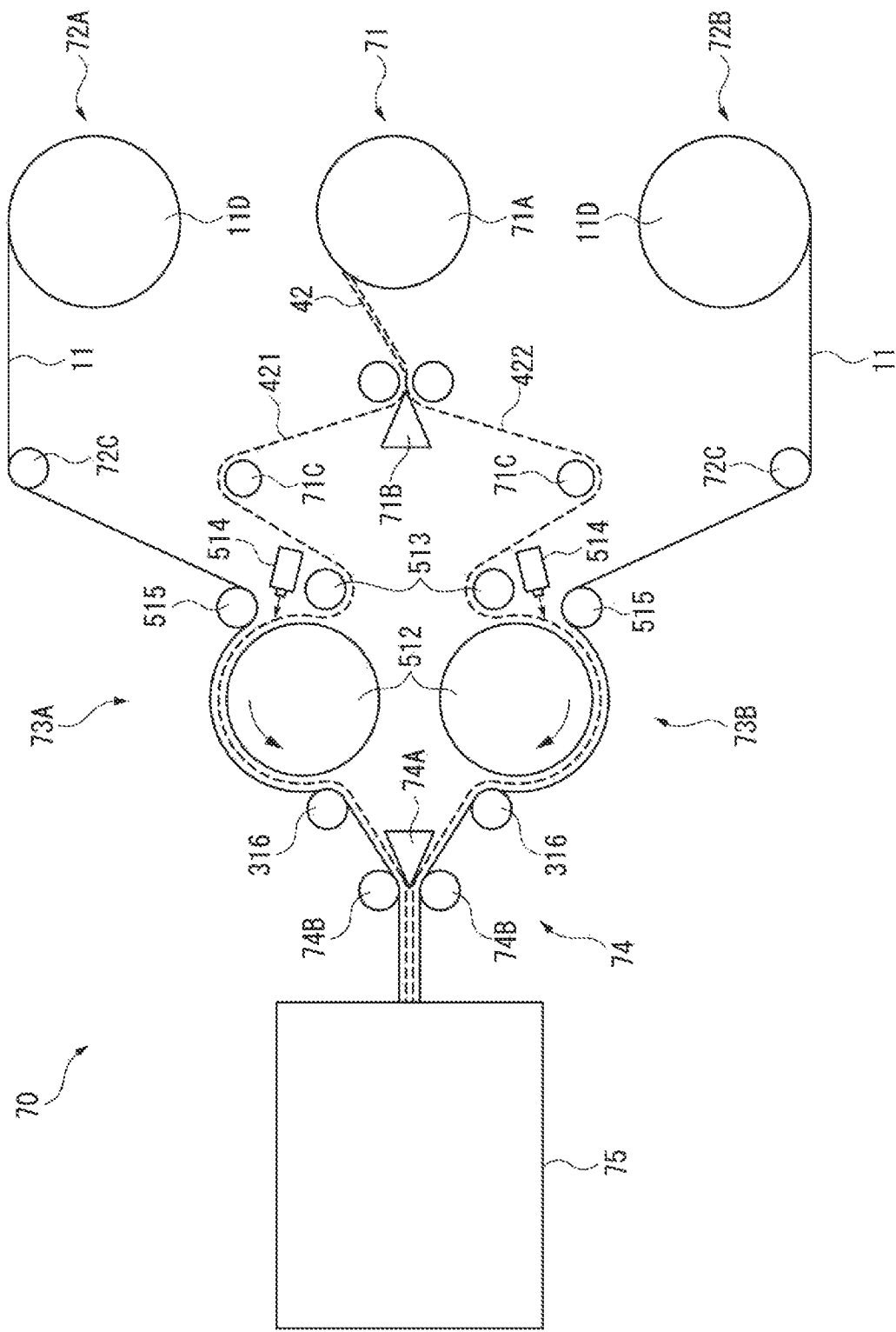
FIG. 22 is a schematic illustration of a manufacturing apparatus of the zipper-tape bag.

FIG. 22 is a schematic illustration showing the manufacturing apparatus of the zipper-tape bag.

As shown in FIG. 22, the manufacturing apparatus 70 includes: a tape feeder 71 configured to feed the male member 421 and the female member 422; a first and a second film feeders 72A, 72B configured to feed two sheets of base film 11; a first bonding unit 73A configured to bond the male member 421 on one of the sheets of base film 11 fed by the first film feeder 72A; a second bonding unit 73B configured to heat-bond the female member 422 on the other of the sheets of base film 11 fed by the second film feeder 72B; a re-fitting unit 74 configured to re-fit the male member 421 and the female member 422; and a bag-making machine 75 configured to make the zipper-tape bag 40 using the two sheets of base film 11 bonded with the zipper tape 42 fitted by the re-fitting unit 74.

The tape feeder 71 is configured to feed and separate the male member 421 and the female member 422 that are initially fed with the convex portion 421B and the concave portion 422B being engaged. The tape feeder 71 includes a tape-winding roller 71A in which the zipper tape 42 having the engaged convex portion 421B and concave portion 422B are wound into a roller, and a separator 71B configured to separate the male member 421 and the female member 422 drawn out from the tape-winding roller 71A.

It should be noted that the separated male member 421 and female member 422 are respectively delivered to the first and second bonding units 73A, 73B via intermediate rollers 71C.

Each of film-winding rollers 11D, in which the base film 11 is wound into a roller, is attached to each of the first and second film feeders 72A, 72B. It should be noted that the sheets of base film 11 drawn out from the film-winding rollers 11D are respectively delivered to the first and second bonding units 73A, 73B via intermediate rollers 72C.

The first and second bonding units 73A, 73B, as in the first exemplary embodiment, each include: the rotary drum 512 rotated by a drive source (not shown); an introduction roller 513 configured to introduce delivered one of the male member 421 and the female member 422 onto the circumferential surface of the rotary drum 512; the laser irradiation device 514; the compression roller 515, and the like.

It should be noted that the introduction groove 512A of each of the rotary drums 512 has a shape capable of receiving the male member 421 or the female member 422 and has such a depth that the bonding surface 61A of the received male member 421 or female member 422 is substantially flush with the circumferential surface of the rotary drum 512.

The re-fitting unit 74 is configured to re-fit the convex portion 421B of the male member 421 and the concave portion 422B of the female member 422 bonded to the base film 11 respectively by the first and second bonding units 73A, 73B.

The re-fitting unit 74 includes: a guide member 74A configured to guide the male member 421 and the female member 422; and a pair of rollers 74B for re-fitting.

Manufacturing Method of Zipper-Tape Bag

Next, a manufacturing method of the zipper-tape bag 40 will be described below.

The zipper tape 42 drawn out from the tape-winding roller 71A is disengaged to be separated into the male member 421 and the female member 422 by the separator 71B, which are respectively fed to the first and second bonding units 73A, 73B. The sheets of base film 11 drawn out from the film-winding rollers 11D are respectively delivered to the first and second bonding units 73A, 73B.

The male member 421 and the female member 422 are introduced into the introduction groove 512A of the rotary drum 512 by the introduction rollers 513 and continuously travel in conjunction with the rotation of the rotary drums 512. The bonding surface 61A of each of the continuously travelling male member 421 and female member 422 is simultaneously irradiated with the laser beam X by the laser irradiation device 514 to melt the bonding surface 61A (irradiation step).

Immediately after the bonding surface 61A is melted in the irradiation step, the delivered base film 11 is wrapped around on the circumferential surface of the rotary drum 512 by the compression rollers 515, whereby the base film 11 continuously travels on the circumferential surface of the rotary drum 512. Then, the bonding step, in which the melted bonding surface 61A is pressure-bonded to the sealant layer 11C of the base film 11, is performed. The bonding surface 61A is gradually cooled and solidified while being pressed against each of the sheets of base film 11 by the compression rollers 515 to be firmly bonded to each of the sheets of base film 11.

The convex portion 421B of the and the concave portion 422B on the sheets of base film 11 bonded with the male member 421 and the female member 422 by the first and second bonding units 73A, 73B are re-fitted by the re-fitting unit 74.

Subsequently, the side seals 411 and the top seal 412 are provided by the bag-making machine 75, thereby producing the zipper-tape bag 40.

Advantages of Fourth Exemplary Embodiment

As described above, in the fourth exemplary embodiment, the laser beam X is applied on the bonding surface 21A of the zipper tape 42 introduced on the circumferential surface of the rotary drum 512 to melt the bonding surface in the same manner as in the first exemplary embodiment. Subsequently, the base film 11 is wrapped around the rotary drum 512 to be pressed against and bonded to the zipper tape 42.

Accordingly, the fourth exemplary embodiment offers the same advantages as those of the first exemplary embodiment.

Further, after the zipper tape 42 is disengaged, the bonding surface 61A of each of the male member 421 and female member 422 is simultaneously irradiated with the laser beam X by the laser irradiation device 514 to melt the bonding surface 61A. Then, after being simultaneously bonded to each of the sheets of base film 11, the male member 421 and the female member 422 are engaged again to form the bag. Accordingly, even when the zipper tape 42 is attached to the two sheets of base film 11, the male member 421 and the female member 422 can be favorably attached to the sheets of base film 11 without causing wrinkles and sags.

Fifth Exemplary Embodiment

Next, a fifth exemplary embodiment of the invention will be described with reference to the drawings.

In the fifth exemplary embodiment, the zipper-tape bag is manufactured using a pillow-bag (including a so-called backlining) making process. In the fifth exemplary embodiment, the same or similar components as those in the third and fourth exemplary embodiments are denoted by the same reference signs and the descriptions thereof will be omitted or simplified.

Figure 23:
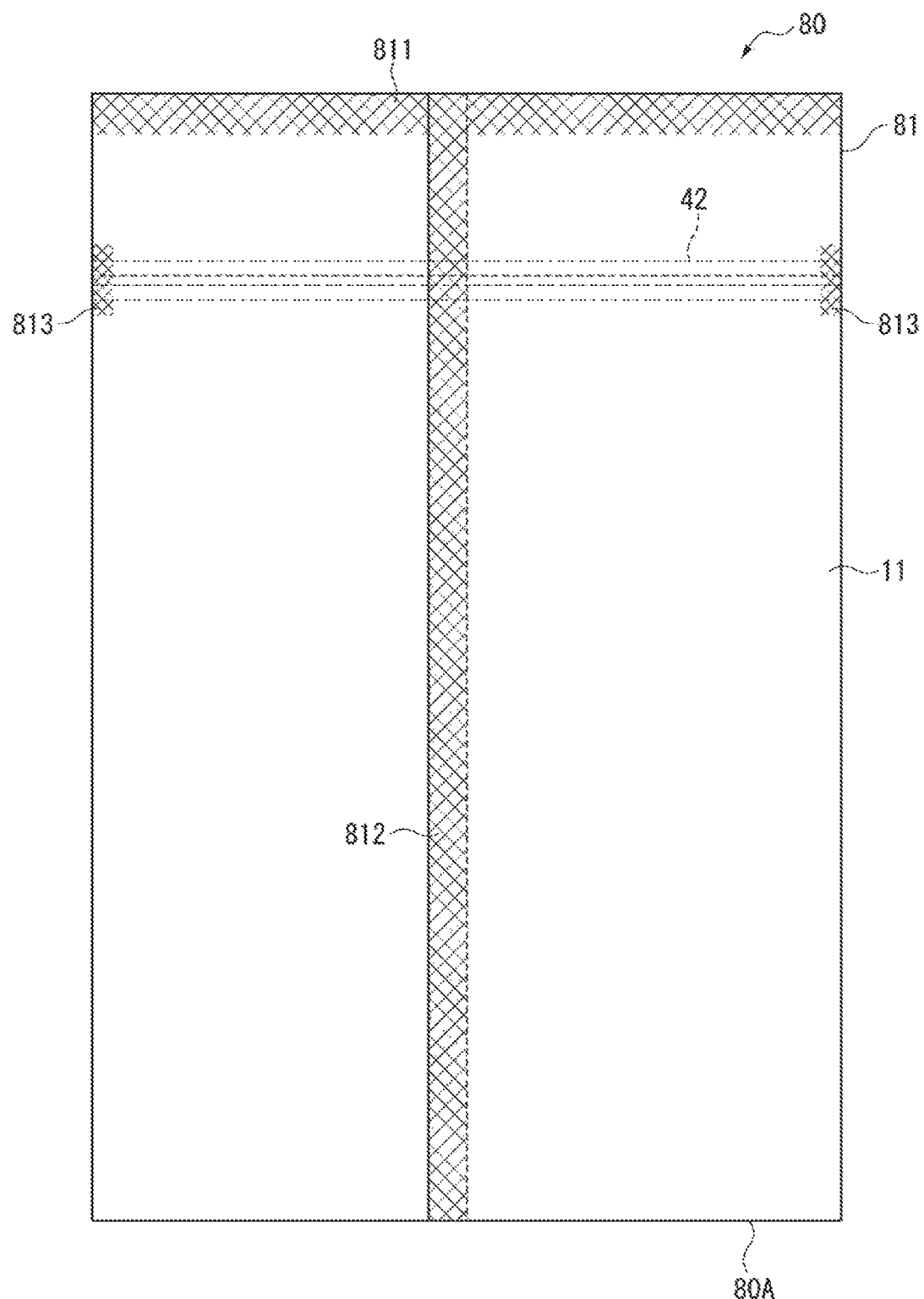
FIG. 23 is a front elevational view showing a zipper-tape bag according to a fifth exemplary embodiment of the invention.

FIG. 23 is a front elevational view showing the zipper-tape bag according to the fifth exemplary embodiment.

Arrangement of Zipper-Tape Bag

As shown in FIG. 23, the zipper-tape bag 80 includes a bag body 81 and a zipper tape 42 attached to an inner surface of the bag body 81.

The bag body 81 is formed by superposing ends of a single base film 11. The bag body 81 includes a top seal 811 formed at an upper end of the bag body 81, an input opening 80A defined at a lower end of the bag body 81 and to be bottom-sealed after contents are put in, and a backlining portion 812 extending between the top seal 811 and the input opening 80A.

Point seal portions 813 are provided on both ends of the zipper tape 42 to prevent the contents from being leaked from an inside of the zipper-tape bag 80.

Manufacturing Method of Zipper-Tape Bag

Next, a manufacturing method of the zipper-tape bag 80 will be described below with reference to the drawings.

Figure 24:
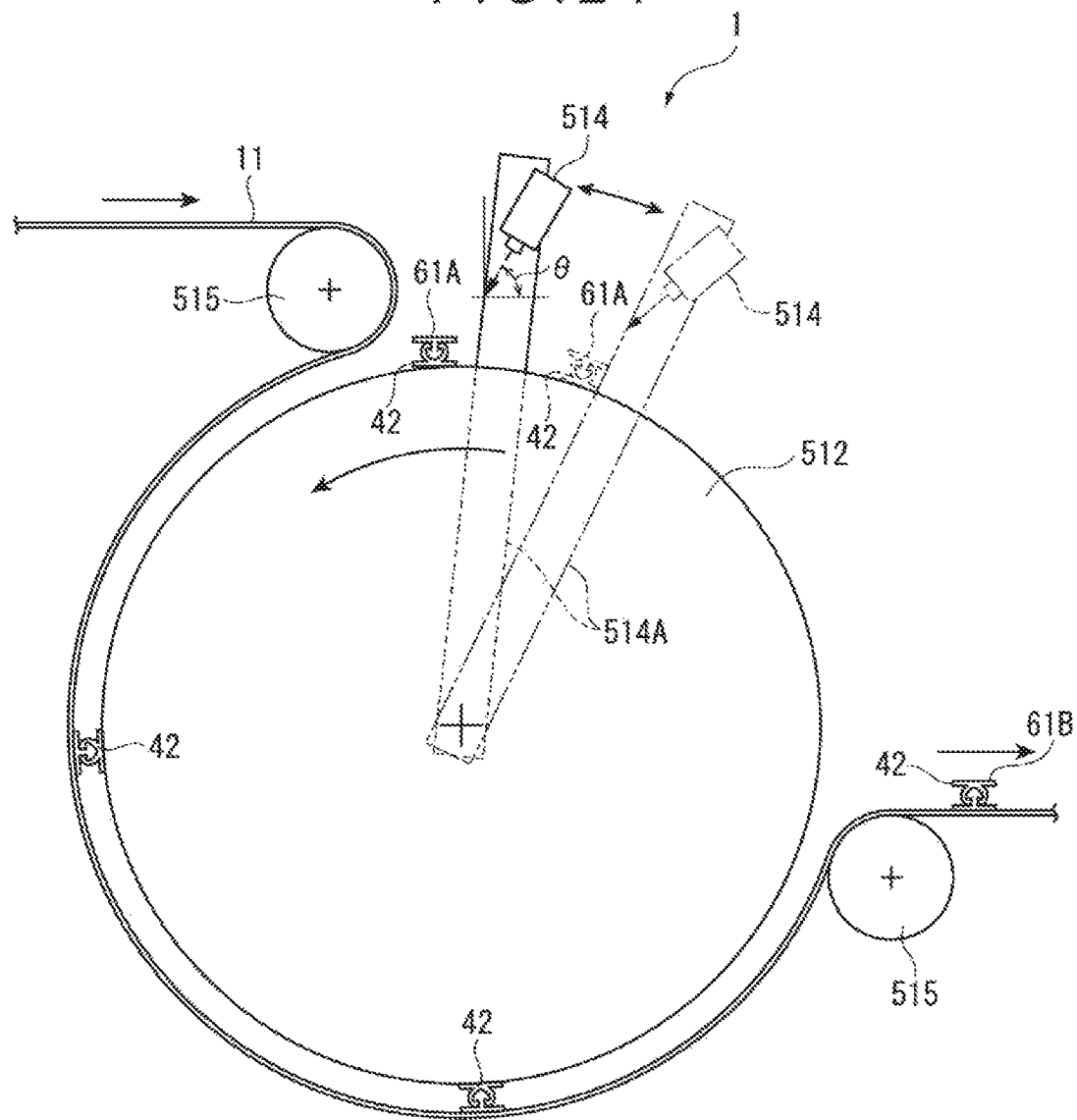
FIG. 24 illustrates a step for bonding the zipper tape to a base film.
Figure 25:
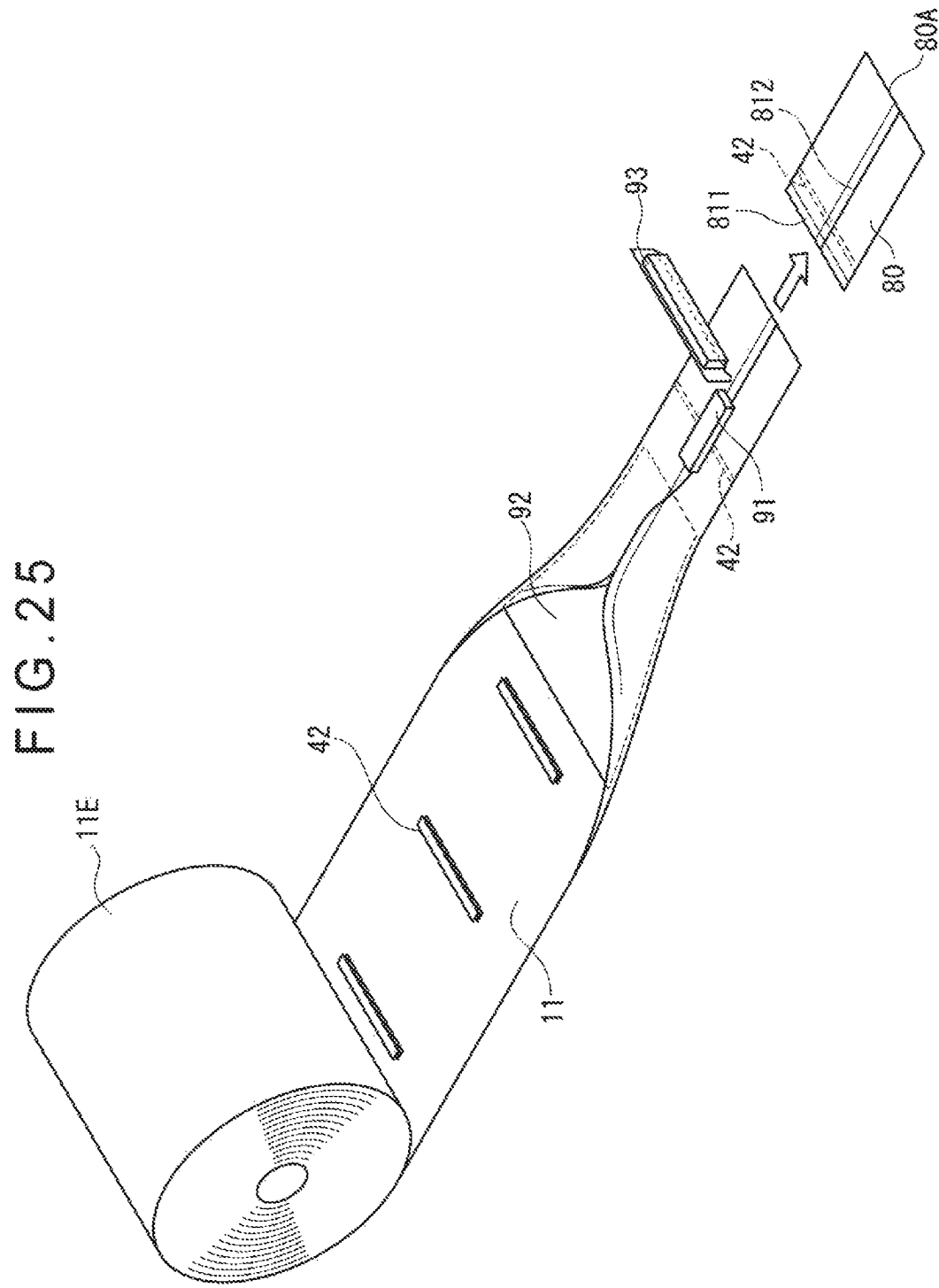
FIG. 25 illustrates a step for making the zipper-tape bag.

FIG. 24 illustrates a step for bonding the zipper tape to a base film. FIG. 25 illustrates a step for making the zipper-tape bag from the base film attached with the zipper tape.

The zipper tape 42 with the convex portion 421B and the concave portion 422B being engaged is cut into piece(s) having a length approximately half of the width of the base film 11 (i.e. the same length as the width of the zipper-tape bag 80 (a dimension in right-left direction in FIG. 23)). As shown in FIG. 24, the cut zipper tape 42 is intermittently fed onto the circumferential surface of an upper side of the rotary drum 512 so that the longitudinal direction of the cut zipper tape 42 is aligned with the axial direction of the rotary drum 512, and the cut zipper tape 42 is held on the circumferential surface of the rotary drum 512.

The zipper tape 42 is held on the circumferential surface of the rotary drum 512, for instance, by: peelably adhering the zipper tape 42 on an adhesive layer provided on the circumferential surface of the rotary drum 512; sucking the zipper tape 42 using suction port(s) formed on the circumferential surface of the rotary drum 512 to hold the zipper tape 42 with suction air; or attracting the zipper tape 42 by a magnetic field generated on the circumferential surface of the rotary drum 512 (when a magnetic material is blended in the bonding surface 61A in order to enhance the absorption capability of the laser beam X).

Then, the bonding surface 61A of the zipper tape 42 held on the rotary drum 512 and rotated in conjunction with the rotation of the rotary drum 512 is simultaneously irradiated with the laser beam X by the laser irradiation device 514 attached to a plate 514A to melt the bonding surface 61A (irradiation step).

In applying the laser beam X, the plate 514A is moved to follow the rotation of the rotary drum 512 to reliably melt the bonding surface 61A.

Immediately after the bonding surface 61A is melted in the irradiation step, the delivered base film 11 is wrapped around the circumferential surface of the rotary drum 512 by the compression rollers 515, whereby the base film 11 continuously travels on the circumferential surface of the rotary drum 512 and the melted bonding surface 61A is pressure-bonded to the base film 11 (bonding step). The bonding surface 61A is gradually cooled and solidified while being pressed against the base film 11 by the compression rollers 515 to be firmly bonded to the base film 11.

Through the above process, the zipper tape 42 is attached with the longitudinal direction of the zipper tape 42 being aligned with the width direction of the base film 11, thereby producing the zipper-tape-attached film roller 11E as shown in FIG. 25.

Subsequently, a bag-making (pillow bag-making) step is conducted by feeding the base film 11 from the zipper-tape-attached film roller 11, aligning ends of the film 21 in the width direction on each other, and backlining-sealing the layered ends of the base film 11 using a center press 91. Herein, a guide plate 92 is used for aligning the ends of the base film 11 in the width direction.

It is not necessary to feed the base film 11 from the zipper-tape-attached film roller 11E but the backlining-sealing may be directly conducted on the base film 11 attached with the zipper tape 42 after the bonding step without turning the base film 11 into a roller.

Next, using a heat seal bar 93 disposed in parallel to the width direction of the base film 11, both ends of the zipper tape 42 are point-sealed and a bonding surface 61B (see FIG. 24) of the zipper tape 42 not bonded to the base film 11 is heat-sealed to the base film 11. Further, the heat seal bar 93 is used to provide the top seal 811.

Subsequently, the base film 11 is cut at an upper stream side of the top seal portion to provide the zipper-tape bag 80 with a side opposite to the top seal portion of the base film 11 being opened.

After contents are filled into thus manufactured zipper-tape bag 80 through the input opening 80A, the zipper-tape bag 80 is heat-sealed (bottom seal) in use.

Advantages of Fifth Exemplary Embodiment

As described above, in the fifth exemplary embodiment, the laser beam X is applied on the bonding surface 61A of the zipper tape 42 introduced on the circumferential surface of the rotary drum 512 to melt the bonding surface in the same manner as the third and fourth exemplary embodiments. Subsequently, the base film 11 is wrapped around the rotary drum 512 to be pressed against and bonded to the zipper tape 42. Accordingly, the same advantages as those in the third and fourth exemplary embodiments can be obtained.

In the fifth exemplary embodiment, the laser beam X is applied on the bonding surface 61A of the zipper tape 42 to melt the bonding surface 61A while the zipper tape 42 is held on the rotary drum 512 with the longitudinal direction of the zipper tape 42 being aligned with the axial direction of the rotary drum 512. Accordingly, the zipper tape 42 can be melted by the laser beam X in a short time, so that the zipper tape 42 can be sequentially bonded to the base film 11 in a short time.

Further, in the fifth exemplary embodiment, the zipper tape 42 is held by adhering the zipper tape 42 on the adhesive layer on the rotary drum 512 or sucking the zipper tape 42 by suction air.

Accordingly, the zipper tape 42 can be appropriately held on the rotary drum 512 and can be reliably bonded to a predetermined position on the base film 11.

Further, in the fifth exemplary embodiment, the laser beam X is applied following the circular movement of the zipper tape 42 in conjunction with the rotation of the rotary drum 512.

Accordingly, the zipper tape 42 can be reliably melted and can be reliably bonded to the base film 11.

Modification(s)

The most preferable configuration for practicing the invention or the like have been disclosed above, however, the invention is not limited thereto. In other words, while the invention has been particularly explained and illustrated mainly in relation to a specific exemplary embodiment, a person skilled in the art could make various modifications in terms of materials, quantity or other particulars to the above described exemplary embodiments without deviating from the technical idea or any object of the invention.

Accordingly, the description that limits the materials and the layer structure is only an example to make the invention easily understood, but is not intended to limit the invention, so that the invention includes the description using a name of component without a part of or all of the limitation on the shape and the material etc.

For instance, the rotary drum 512 is not necessarily continuously rotated but may be intermittently rotated.

The rotary drum 512 of the third and fourth exemplary embodiments is not necessarily provided with the introduction groove 512A.

The rotary drum 512 of the fifth exemplary embodiment does not necessarily hold the zipper tape 42 by adhering or sucking, but may hold the zipper tape 42 by providing a corresponding plurality of introduction grooves 512A with a longitudinal direction being aligned with the axial direction of the rotary drum 512 and receiving the zipper tape 42 in the introduction groove 512A.

Though the zipper tapes 60, 42 including the longitudinal belt-shaped flat bonding surface 61A are described above, such an arrangement is not exhaustive. For instance, when the laser beam X is applied on the side portions of the bonding surface 61A in the longitudinal direction, a pair of ribs each projecting in a form of a rail may be provided and the projecting top of each of the ribs may be used as the bonding surface 61A. Further, the male belt-shaped base 421A and the female belt-shaped base 422A may have a wavy meandering shape in the longitudinal direction or may have a meandering bonding surface 61A.

The laser beam X is not necessarily applied to melt the entire surface of the bonding surface 61A but may be applied so as to melt only a part of the width of the bonding surface 61A along the longitudinal direction.

The laser beam X may be vertically applied onto the bonding surface 61A.

Though the part of the zipper tapes 60, 42 corresponding to the bonding surface 61A has a composition having absorption capability of the laser beam, such an arrangement is not exhaustive.

Further, though the zipper tapes 60, 42 are bonded to the base film 11, the invention is usable for the other applications.

For instance, the invention is applicable to a process for bonding an elongated member such as a belt-shaped tear tape or tear thread for unsealing, a functional sheet including antioxidant or oxygen absorber, a reinforcement tape for keeping an open state, and a tamper-proof tape configured to leave traces of unsealing, to various elongated members (e.g. a film and a tape).

In the fourth exemplary embodiment, the laser beam X is not necessarily simultaneously applied on the male member 421 and the female member 422.

Though the bonding surface 61A of the engaged zipper tape 42 is melted by being irradiated with the laser beam X and the bonding surface 21B of the zipper tape 42 is heat-sealed in the fifth exemplary embodiment, such an arrangement is not exhaustive. For instance, the laser irradiation device 514 may be placed on a plate and located at an inside of the cylindrical base film 11 after being back-lining-sealed. Then, after irradiating the bonding surface 61B with the laser beam X to melt the bonding surface 61B, the bonding surface 61B may be pressed from an outer surface of the base film 11 using a roller to provide the top seal 811.

Further, the zipper tapes 60, 42 and the base film 11 are not necessarily pressure-bonded using the compression rollers 515. For instance, the zipper tapes 60, 42 and the base film 11 may be pressure-bonded using an endless belt rotated in synchronization with the rotary drum 512 or may be pressed by a press bar.

The invention claimed is:

1. A zipper tape comprising:
a pair of a male member and a female member; wherein
the male member comprises a male belt-shaped base and a male portion provided on a side of the male belt-shaped base, the male belt-shaped base comprising a layered structure comprising at least two layers provided integrally with each other,
the female member comprises a female belt-shaped base and a female portion which is provided on a side of the female belt-shaped base and is capable of receiving the male portion, the female belt-shaped base comprising a layered structure comprising at least two layers,
at least one of the layered structure of the male belt-shaped base and the layered structure of the female belt-shaped base comprises a light-absorbing layer exposed on a side opposite the side on which the male portion or the female portion is exposed, the light-absorbing layer comprising a light-absorbing material having a wavelength absorption range from 800 nm to 1200 nm, and
wherein the light-absorbing layer comprises the light absorbing material mixed in a resin composition.

2. The zipper tape according to claim 1, wherein the light-absorbing material is at least one of an organic compound and an inorganic compound, the organic compound being at least one compound selected from the group consisting of a phthalocyanine compound, a cyanine compound, an aminium compound, an imonium compound, a squarylium compound, a polymethine compound, an anthraquinone compound and an azo compound, the inorganic compound being at least one substance selected the group consisting of carbon black, an element metal, a metal salt, a metal complex, a metal nitride, a metal oxide, and a metal hydroxide.

3. The zipper tape according to claim 1, wherein,
at least one of the male belt-shaped base and the female belt-shaped base comprises the light-absorbing layer as at least one of the at least two layers other than a surface layer on which the male portion or the female portion are provided.

4. The zipper tape according to claim 1, wherein,
the male member comprises a layered structure comprising at least three layers,
the female member comprises a layered structure comprising at least three layers, and
at least one of the male belt-shaped base and the female belt-shaped base comprises:
 a bonding layer exposed on a side opposite the side on which the male portion or the female portion is exposed, the bonding layer comprising a resin whose melting point ranges from 60 degrees C. to 120 degrees C.; and
 the light-absorbing layer adjacent to the bonding layer.

5. The zipper tape according to claim 3, wherein,
at least one of the male portion and the female portion is formed of a resin not absorbing a wavelength ranging from 800 nm to 1200 nm.

6. The zipper tape according to claim 1, wherein the resin composition has a melting point ranging from 60 degrees C. to 120 degrees C.

7. The zipper tape according to claim 4, wherein,
a main component of the resin is a metallocene olefin produced using a metallocene catalyst.

8. A zipper-tape bag comprising
a bag body comprising an at least partially overlapped film; and
a zipper tape according to claim 1, which is attached to an inner surface of the bag body.

9. A method of manufacturing a zipper-tape bag by attaching the zipper tape according to claim 1 on a film, the method comprising:
 irradiating the zipper tape with an energy beam of a wavelength ranging from 800 nm to 1200 nm; and
 pressure-bonding the film on a part of the zipper tape irradiated with the energy beam to be melted by the irradiating.

10. The method of manufacturing a zipper-tape bag according to claim 9, wherein
 in the irradiating, the zipper tape is moved along a circumferential surface of a roller while the zipper tape is held on the circumferential surface of the roller, and the energy beam is applied on a bondable portion of the zipper tape to be bonded with the film and facing in an outer circumferential direction of the roller, and
 in the pressure-bonding, the film is wrapped around the circumferential surface of the roller to be moved at a position downstream in a moving direction of the zipper tape on the roller with respect to a point irradiated with the energy beam, and the film is pressure-bonded to the bondable portion of the zipper tape.

11. The method of manufacturing a zipper-tape bag according to claim 9, wherein
 in the irradiating, using the roller comprising an introduction groove in a form of a dented groove along a circumferential direction, while the zipper tape is received in the introduction groove, the zipper tape is moved along the circumferential surface of the roller and the energy beam is applied on a bondable portion of the zipper tape.

12. The method of manufacturing a zipper-tape bag according to claim 11, wherein
 the introduction groove of the roller has such a depth that the bondable portion of the zipper tape is flush with the circumferential surface of the roller.

13. The method of manufacturing a zipper-tape bag according to claim 10, wherein
 in the irradiating, the zipper tape is moved along the circumferential surface of the roller while the zipper tape is held with a longitudinal direction of the zipper tape being aligned with an axial direction of the roller, and the energy beam is applied on the bondable portion of the zipper tape facing in an outer circumferential direction of the roller.

14. The method of manufacturing a zipper-tape bag according to claim 10, wherein
 in the irradiating, the energy beam is applied at an incident angle intersecting a normal line of the circumferential surface of the roller.

15. A bonding device of a zipper tape configured to bond the zipper tape according to claim 1 to a film, the bonding device comprising:
 a roller configured to hold the zipper tape on a circumferential surface thereof;
 an irradiator configured to apply an energy beam on a part of the zipper tape held on the roller and to be bonded with the film, the part of the zipper tape facing in an outer circumferential direction of the roller, and
 a pressure-bonder configured to wrap and move the film around the circumferential surface of the roller and located at a position downstream in a moving direction of the zipper tape on the roller with respect to a point irradiated with the energy beam, and to pressure-bond the film to a bondable portion of the zipper tape.

16. The zipper tape according to claim 1, wherein,
the male member and the female member respectively including a base portion integrated with the male portion or the female portion as a layer of the layered structure and
at least one of the male member and the female member comprises the light-absorbing layer layered on the base portion.

17. The zipper tape according to claim 1, wherein
the resin composition comprises a first metallocene linear low-density polyethylene whose melt flow rate (MFR) is 5 g/10 min or less and a second metallocene linear low-density polyethylene or a copolymer of propylene and an alpha-olefin having 4 to 8 carbon atoms whose MFR is more than 5 g/10 min.

* * * * *